(12) United States Patent
Maeng et al.

(10) Patent No.: US 11,170,363 B1
(45) Date of Patent: Nov. 9, 2021

(54) SECURE PROCESSING OF ONLINE PURCHASE USING A MOBILE WALLET

(71) Applicant: Wells Fargo Bank, N.A., San Francisco, CA (US)

(72) Inventors: Joon Maeng, Newcastle, WA (US); Ramanathan Ramanathan, Bellevue, WA (US); Thomas Hayes, Katy, TX (US)

(73) Assignee: Wells Fargo Bank, N.A., San Francisco, CA (US)

(*) Notice: Subject to any disclaimer, the term of this patent is extended or adjusted under 35 U.S.C. 154(b) by 1225 days.

(21) Appl. No.: 15/362,515

(22) Filed: Nov. 28, 2016

(51) Int. Cl.
| | |
|---|---|
| G06Q 20/36 | (2012.01) |
| G06Q 20/38 | (2012.01) |
| G06Q 20/32 | (2012.01) |
| G06Q 20/20 | (2012.01) |
| G06Q 20/40 | (2012.01) |

(52) U.S. Cl.
CPC .......... *G06Q 20/36* (2013.01); *G06Q 20/206* (2013.01); *G06Q 20/3276* (2013.01); *G06Q 20/3829* (2013.01); *G06Q 20/401* (2013.01); *G06Q 2220/12* (2013.01)

(58) Field of Classification Search
CPC .. G06Q 20/36; G06Q 20/206; G06Q 20/3276; G06Q 20/3829; G06Q 20/401; G06Q 2220/12
USPC .......................................................... 705/71
See application file for complete search history.

(56) References Cited

U.S. PATENT DOCUMENTS

| | | | |
|---|---|---|---|
| 2008/0208743 A1* | 8/2008 | Arthur et al. | |
| 2010/0211506 A1* | 8/2010 | Chang et al. | |
| 2011/0137742 A1 | 6/2011 | Parikh | |
| 2012/0209749 A1* | 8/2012 | Hammad et al. | |
| 2013/0262315 A1 | 10/2013 | Hruska | |
| 2013/0339165 A1 | 12/2013 | Calman | |
| 2014/0379576 A1* | 12/2014 | Marx et al. | |
| 2015/0310537 A1 | 10/2015 | Parikh | |
| 2016/0342989 A1* | 11/2016 | Davis | |
| 2016/0379215 A1* | 12/2016 | Clerkin | |
| 2018/0308086 A1* | 10/2018 | Shan et al. | |

\* cited by examiner

*Primary Examiner* — James D Nigh
*Assistant Examiner* — Yin Y Choi
(74) *Attorney, Agent, or Firm* — Schwegman Lundberg & Woessner, P.A.

(57) ABSTRACT

Various examples are directed to systems and methods for secure purchasing using a mobile wallet. A first mobile wallet may receive secure purchasing data related to an product from a server system associated with a merchant. The secure purchasing data (e.g., stored on a QR code) may include product information and merchant information allowing the mobile wallet to obtain a public key of the merchant. The mobile wallet may determine whether the purchase of the product requires processing by a second mobile wallet based on transaction rules and at least some of the purchasing data. Based on the determination, the first mobile wallet may either send payment data for purchasing the product to the server system of the merchant, without requesting processing by the second mobile wallet or send a request for processing to the second mobile wallet so that the second mobile wallet can approve or purchase the product.

20 Claims, 26 Drawing Sheets

15000

15005 — RECEIVE A FIRST DATA PACKET OVER A FIRST TRANSMISSION PATH AND A SECOND DATA PACKET OVER A SECOND TRANSMISSION PATH, THE FIRST DATA PACKET INCLUDING A FIRST ENCRYPTED TRANSACTION UNIT AND A SECOND CRYPTOGRAPHIC KEY AND THE SECOND DATA PACKET INCLUDING A SECOND ENCRYPTED TRANSACTION UNIT AND A FIRST CRYPTOGRAPHIC KEY

15010 — DECRYPTING THE FIRST ENCRYPTED TRANSACTION UNIT USING THE SECOND CRYPTOGRAPHIC KEY AND THE SECOND ENCRYPTED TRANSACTION UNIT USING THE FIRST CRYPTOGRAPHIC KEY

15015 — COMBINE THE FIRST DECRYPTED TRANSACTION UNIT AND THE SECOND DECRYPTED TRANSACTION UNIT INTO A TRANSACTIONAL MESSAGE

15020 — FORWARDING THE TRANSACTIONAL MESSAGE TO A MOBILE WALLET FOR FURTHER PROCESSING

*FIG. 15*

SECURE PROCESSING OF ONLINE PURCHASE USING A MOBILE WALLET

RELATED APPLICATIONS

This application is related to U.S. patent application Ser. No. 15/264,531 filed Sep. 13, 2015 and titled "SECURE DIGITAL COMMUNICATIONS," U.S. patent application Ser. No. 15/264,532 filed Sep. 13, 2015 and titled "SECURE DIGITAL COMMUNICATIONS," and U.S. patent application Ser. No. 15/264,540 filed Sep. 13, 2015 and titled "SECURE DIGITAL COMMUNICATIONS," each of which is incorporated by reference herein in its entirety.

TECHNICAL FIELD

Embodiments described herein generally relate to mobile wallets and, for example and without limitation, mobile wallets capable of making a secure online purchase.

BACKGROUND

Mobile wallets can allow consumers to make payments for products and services with mobile computing devices instead of cash, credit cards or checks.

DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 15 shows a flowchart of a method for securing mobile wallet message transmissions between a recipient and a sender according to some examples of the present disclosure.

DETAILED DESCRIPTION

Figure 1:
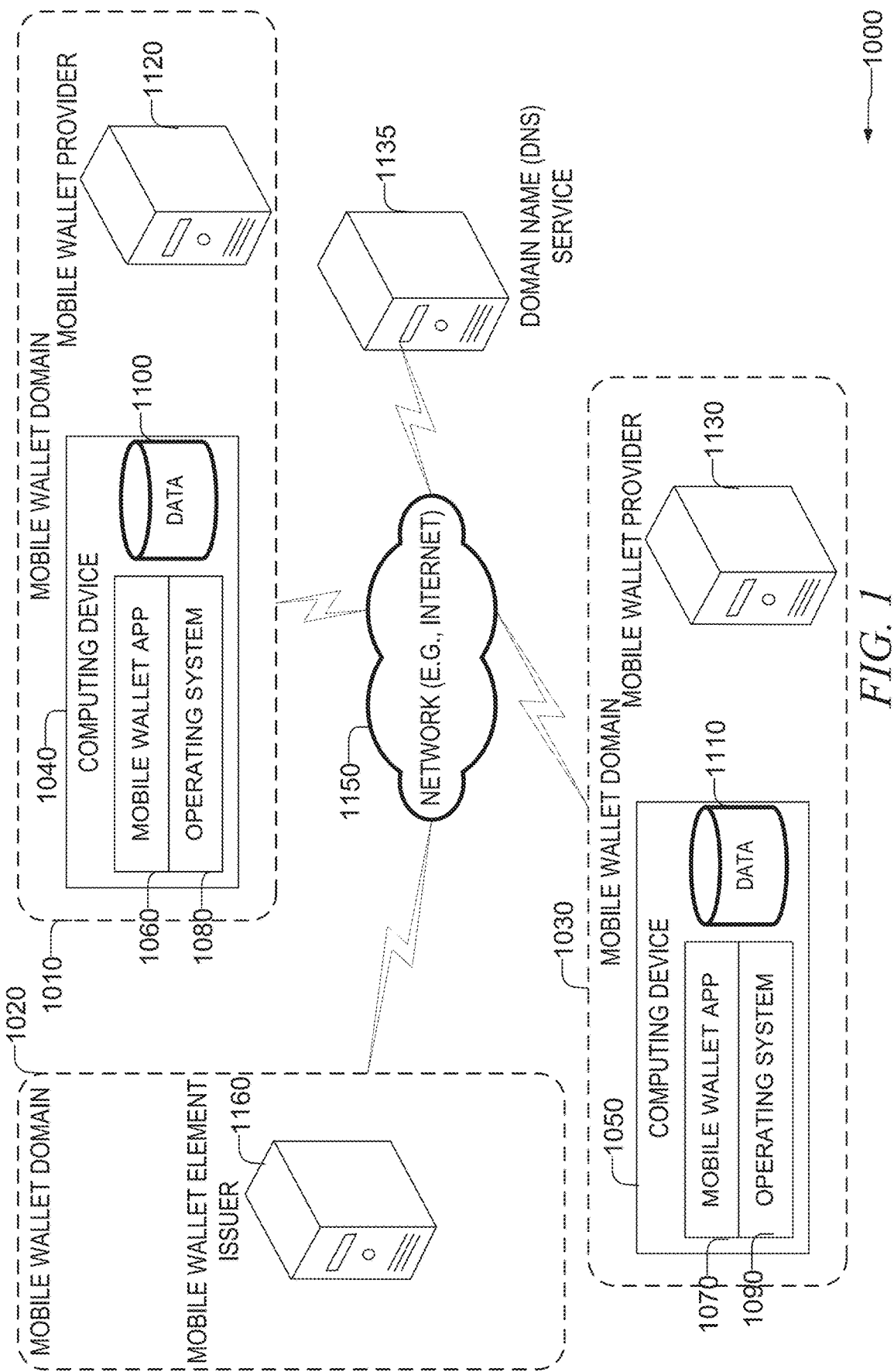
FIG. 1 shows a schematic of a mobile wallet secure digital communication environment according to some examples of the present disclosure.

The present disclosure provides various ways for a mobile wallet to securely purchase one or more products—including goods and services—with online merchants via a network or with merchants via point-of-sale (POS) devices. A mobile wallet may obtain secure purchasing data—by capturing a QR code for example—from a merchant's server system and determine whether further processing by a second mobile wallet is needed for the purchase based on transaction rules and at least some of the purchasing data. Based on the determination, the mobile wallet may either 1) send payment data to the merchant's server system for payment processing without receiving approval from the second mobile wallet or 2) may transfer at least some of the purchasing data to the second mobile wallet for approval or payment processing by the second mobile wallet. The first mobile wallet (or second mobile wallet if payment is made through the second mobile wallet) may send encrypted payment data to the merchant using the merchant's public key.

The purchasing data may be stored in a QR code and may include one or more of product data, buyer data, merchant data, and a unique transaction identifier. With a POS transaction, a POS device may send the purchasing data to the mobile wallet using a near field communication (NFC) path. With an online merchant transaction, the mobile wallet may obtain the purchasing data by capturing an image of a QR code (e.g., generated by the online merchant and presented on another computing device) or by receiving purchasing data via a message from the online merchant, as examples. In this way, a mobile wallet may conveniently make purchases from an online merchant.

The present disclosure also provides various ways for a mobile wallet to transact with online merchants using a POS emulator. In some examples, a mobile wallet connected to an online merchant through an Internet connection may send a POS payment package—a package similar that sent to a merchant server system by a physical POS device—over the Internet connection for processing by the online merchant. The online merchant may process the POS payment package in a similar manner as a traditional POS package from a physical POS device. This provides yet another way for mobile wallets to conveniently transact with online merchants.

A mobile wallet (also known as an electronic or digital wallet) refers to an application program executed by one or more computing devices (e.g., mobile devices such as a smartphone) and corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student ids, library cards, membership cards, insurance cards, and so on. The mobile wallet application allows an individual to use the stored information to pay for items (either in person or in e-commerce transactions), provide for identification (e.g., producing a driver's license), transfer money to others, access bank accounts, collect discount coupons, submit subway passes, and the like. As another example, a mobile wallet may be used to verify the age of a buyer while purchasing alcohol. Exemplary mobile wallets include but are not limited to APPLE PAY®, ANDROID PAY®, GOOGLE WALLET®, CURRENT C® by MCX®, SAMSUNG PAY®, and peer-to-peer payment apps such as VENMO®, SQUARE CASH®, and TILT APP®.

Mobile wallet applications of one user presently do not securely communicate with the mobile wallet applications of another user. The user of the mobile wallet must perform any such communications out-of-channel through email, short message service, or the like. These communications may not be secure.

Disclosed in some examples are methods, systems, and machine readable mediums for secure end-to-end digital communications involving mobile wallets. The result is direct, secure, in-band messaging using mobile wallets that may be used to send messages such as payments, requests for money, financial information, messages to authorize a debit or credit, and messages to provide an identification of the user.

In some examples, mobile wallets will each have an address which will utilize a new Internet top-level domain. For example, fred.jones@abc.mwallet, where "abc" is a mobile wallet domain and mwallet is the top-level domain. While ".mwallet" is used herein, one of ordinary skill with the benefit of the present disclosure will appreciate that other top-level domain names may be utilized. A mobile wallet domain may provide one or more services to the mobile wallets in its domain to facilitate mobile wallet communications. In some examples, mobile wallet domains may be provided by mobile wallet providers.

A first mobile wallet (sender mobile wallet) sends a message to a second mobile wallet (recipient mobile wallet) by utilizing a mobile wallet message transfer agent (MTA) provided by its mobile wallet domain. The MTA of the sender mobile wallet retrieves the public key of the recipient mobile wallet from a public key server (PKS) provided by the recipient's mobile wallet domain. The sender mobile wallet encrypts the message with this public key, sends it to the MTA in its mobile wallet domain, which then sends the message to an MTA provided by the recipient's mobile wallet domain. The recipient mobile wallet domain's MTA stores the encrypted message in a message storage agent (MSA). The MSA notifies the recipient mobile wallet application of the request. The recipient mobile wallet may then download the message and decrypt it with its private key. The encryption keys may be created by the mobile wallets or the mobile wallet domains. The public key may be stored with a PKS and the private key may be maintained in one or more of: the mobile wallet in an encrypted form, the mobile wallet domain provider (e.g., mobile wallet provider), and a trusted third party (which may not be related to the mobile wallet domain provider).

Through utilizing this process, two mobile wallets may securely communicate. Additionally, mobile wallet communications may not be limited to two mobile wallets communicating. The methods and systems disclosed here may be utilized where only one endpoint is a mobile wallet. For example, a merchant may accept a mobile wallet payment through a mobile wallet message. Mobile wallets may communicate with one or more financial institutions using the methods and systems described to authorize payments, deduct funds, transfer funds, and the like. Mobile wallets may communicate with any number of endpoints using the disclosed techniques. Other example endpoints include government agencies, individuals, sellers, buyers, and the like. For example, a mobile wallet may communicate information about a digital identification with a merchant to provide age verification for certain products.

Turning now to FIG. 1, a schematic 1000 of a mobile wallet secure digital communication environment is shown according to some examples of the present disclosure. Three mobile wallet domains 1010, 1020, and 1030 are shown. Mobile wallet domains 1010 and 1030 include two respective user computing devices 1040 and 1050 with mobile wallet applications 1060 and 1070 executing along with operating systems 1080 and 1090 respectively. Mobile wallet domains may be provided by one or more mobile wallet providers. Mobile wallet providers may administer one or more mobile wallet domains. The mobile wallet applications 1060 and 1070 may originate from the mobile wallet providers 1120 and 1130 respectively.

Mobile wallet applications 1060 and 1070 store one or more data structures that store digital representations of payment and non-payment elements of the user. In some examples, this may be identification information (drivers licenses), financial information (credit card information, bank card information, bank account information), and the like. A digital representation may include one or more information fields stored by the mobile wallet and providing information about the user (e.g., account number, user age, user name, and the like) and in some cases verification (e.g., a certificate or other means to assure that the digital representation is authentic). Operating systems 1080 and 1090 provide services to the mobile wallets (and other applications) on the computing devices 1040 and 1050 such as scheduling tasks for execution, controlling peripherals, providing an interface to the hardware, managing memory, and the like.

Computing devices 1040 and 1050 may also contain data storage devices 1100 and 1110 that may store mobile wallet application data, including mobile wallet messages, encryption keys, address books, data structures storing information about the user of the computing device (such as information on payment and non-payment elements of the mobile wallet), and the like. Mobile wallet domains 1010, and 1030 may have mobile wallet providers 1120 and 1130 that provide mobile wallet communication services to the mobile wallets within their respective mobile wallet domains 1010 and 1030. Example services include message forwarding, message storage, message encryption, and the like.

Domain Name Service (DNS) 1135 translates a domain name (e.g., abc@walletprovider.mwallet) to an Internet Protocol (IP) address that may be utilized to send messages to that mobile wallet domain. Mobile wallet domains 1010, 1020, 1030, and DNS 1135 may communicate over computer network 1150, which in some examples may be the Internet. Mobile wallet domain 1020 may include mobile wallet element issuer 1160. Mobile wallet element issuer 1160 may contain applications which may communicate with mobile wallets in other mobile wallet domains according to the present disclosure. Example mobile wallet issuers include banks, merchants, government organizations, corporations, or the like. In some examples, the mobile wallet provider (e.g., mobile wallet providers 1120 and/or 1130) and the mobile wallet element issuer 1160 may be the same entity.

Figure 2:
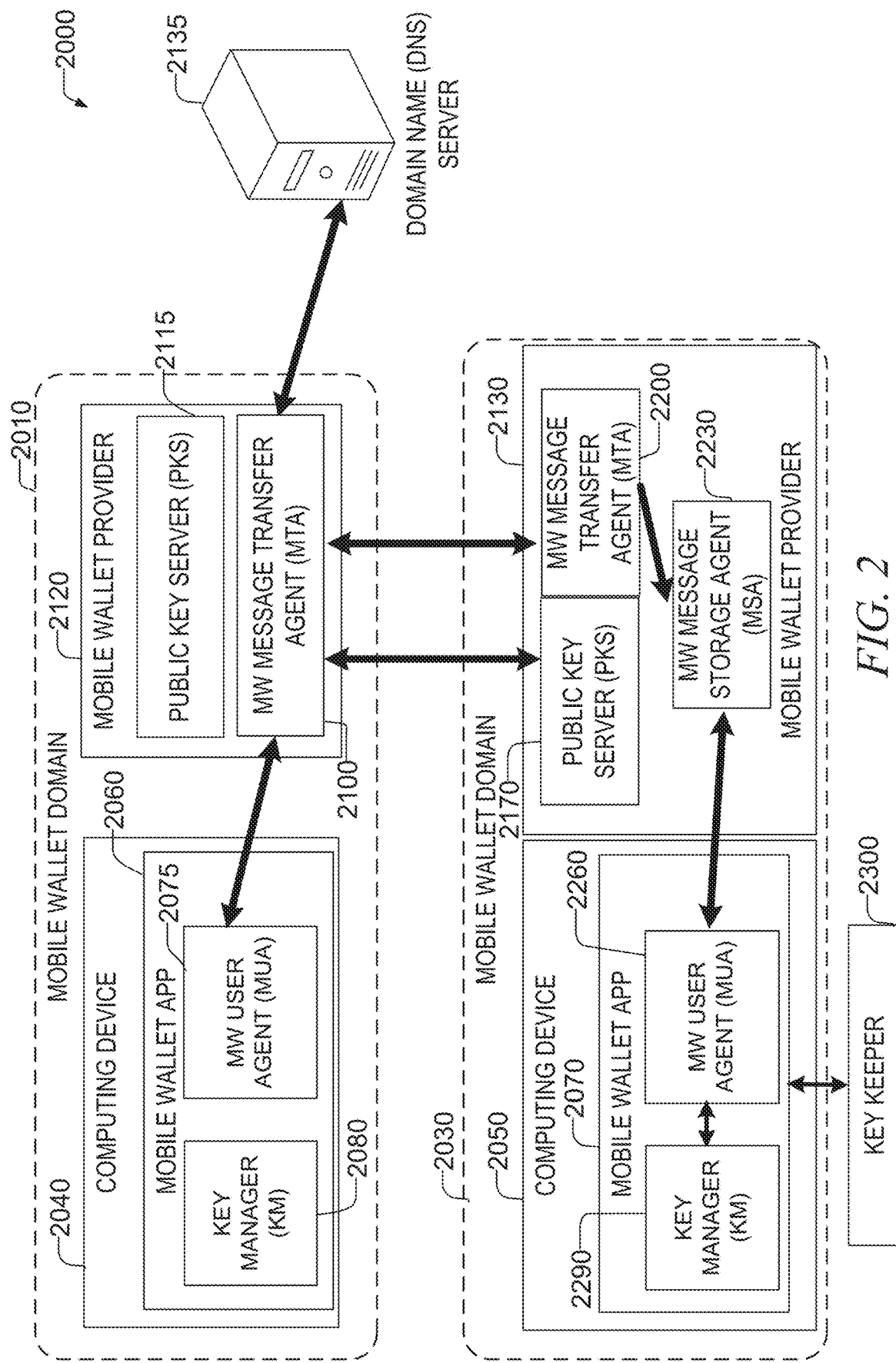
FIG. 2 shows a schematic of a mobile wallet to mobile wallet secure digital communication according to some examples of the present disclosure.

Mobile wallet element issuer 1160 may issue one or more identification cards, credit cards, bank cards, bank accounts, or the like to one or more users of mobile wallets (e.g., mobile wallet applications 1060 and 1070). Mobile wallet element issuer 1160 may include one or more of the components of mobile wallet providers 1120 and 1130 as shown in FIG. 2 (e.g., PKS, MTA, MSA). In some examples, these elements may be issued by sending the digital representations to one or more mobile wallet recipients. Thus, using the disclosed techniques, it may be possible to automatically provision and populate a mobile wallet with little consumer effort.

Turning now to FIG. 2, a schematic 2000 of a mobile wallet to mobile wallet secure digital communication is shown according to some examples of the present disclosure. Mobile wallet domain 2010 may be an example implementation of mobile wallet domain 1010 and mobile wallet domain 2030 may be an example implementation of mobile wallet domain 1030 of FIG. 1. Similarly, computing device 2040, mobile wallet application 2060 and mobile wallet provider 2120 may be an example implementation of computing device 1040, mobile wallet application 1060 and mobile wallet provider 1120 respectively of FIG. 1 in some examples. Computing device 2050, mobile wallet application 2070 and mobile wallet provider 2130 may be an example implementation of computing device 1050, mobile wallet application 1070 and mobile wallet provider 1130 respectively of FIG. 1 according to some examples.

A first mobile wallet application 2060 executing on a computing device 2040 in a first mobile wallet domain 2010 is sending a message to a second mobile wallet application 2070 executing on a second computing device 2050 in a second mobile wallet domain 2030. Mobile wallet application 2060 may include a mobile wallet user agent (MUA) 2070 and a key manager 2080. The MUA 2075 allows users to compose, send and retrieve mobile wallet (MW) messages. Key manager 2080 may one or more of: create, provision, register, store, and manage one or more cryptographic keys. Key manager 2080 may register (or obtain) a public key with a certificate authority (not shown for clarity) and with a PKS 2115.

A mobile wallet application 2060 may provide one or more graphical user interfaces (GUI)s to allow users to compose and edit one or more mobile wallet messages. Before sending a message, the MUA 2075 requests the recipient's public key from the MTA 2100. The PKS 2115 and MTA 2100 may be provided by the mobile wallet provider 2120 of the mobile wallet domain 2010. The PKS 2115 and MTA 2100 may be provided by the same computing device, or different computing devices. While the PKS 2115 and MTA 2100 are shown as part of the mobile wallet provider 2120, they may be provided by separate entities. The MTA and PKS are accessible to computing device 2040 and other computing devices both within the mobile wallet domain 2010 and other devices within other mobile wallet domains, over one or more networks (not shown for clarity). These networks may include one or more portions of: Local Area Networks (LAN), Wide Area Networks (WAN), Metropolitan Area Networks (MAN), the Internet, cellular networks, and the like.

The MTA 2100 first examines the message to determine which mobile wallet domain the recipient is in. If the mobile wallet domain is mobile wallet domain 2010, the MTA may retrieve the public key from the PKS 2115 of mobile wallet domain 2010. If the mobile wallet domain is in another domain, then the MTA checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to the PKS 2170 asking for the public key of the recipient mobile wallet (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature can be verified using the CA's public key (which is known and may be pre-installed on the computing devices). This may serve as a means to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the MUA 2075 then encrypts the contents of the message with the received public key and sends it to the MTA 2100. The MTA 2100 determines the IP Address of the recipient mobile wallet domain's MTA 2200. In some examples, the MTA 2100 utilizes the IP Address previously determined from the DNS server (e.g., using the cache) when retrieving the public key of the recipient. For example, the PKS 2170 and MTA 2200 may have the same IP Address, or the IP Address of the MTA 2200 may be derivable from the IP Address of the PKS 2170. In other examples a mobile wallet application in mobile wallet domain 2010 may have previously communicated with a mobile wallet in mobile wallet domain 2030 (and thus the MTA 2100 still has the IP Address in its cache). In other examples, the MTA 2100 may re-request the IP Address from the DNS server 2135.

The MTA 2100 then sends the message 2190 to the MTA 2200 of the mobile wallet provider 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet message storage agent (MSA) 2230. Note that the mobile wallet provider 2120 may also employ a MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in the key manager 2290. Key manager 2290 may communicate with key keeper 2300. Key keeper 2300 may be a remote key storage facility to prevent the loss of the cryptographic keys should the computing device 2050 experience a loss in data. For example, the key manager 2290 may store one or more keys of the mobile wallet application 2070 in the key keeper 2300.

In some examples, the mobile wallet application 2070 may utilize a second cryptographic key to encrypt the private key. The private key may then be stored with the mobile wallet provider 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the mobile wallet provider 2130 and thus the user can entrust that no one associated with the mobile wallet provider 2130 can access their messages. The key keeper 2300 may be a trusted entity by the mobile wallet 2070 which may be a service provider, a home computer of the mobile wallet owner, a companion device of the computing device 2050 (e.g., a smart watch that can be paired with a smartphone with mobile wallet), etc.

Figure 3:
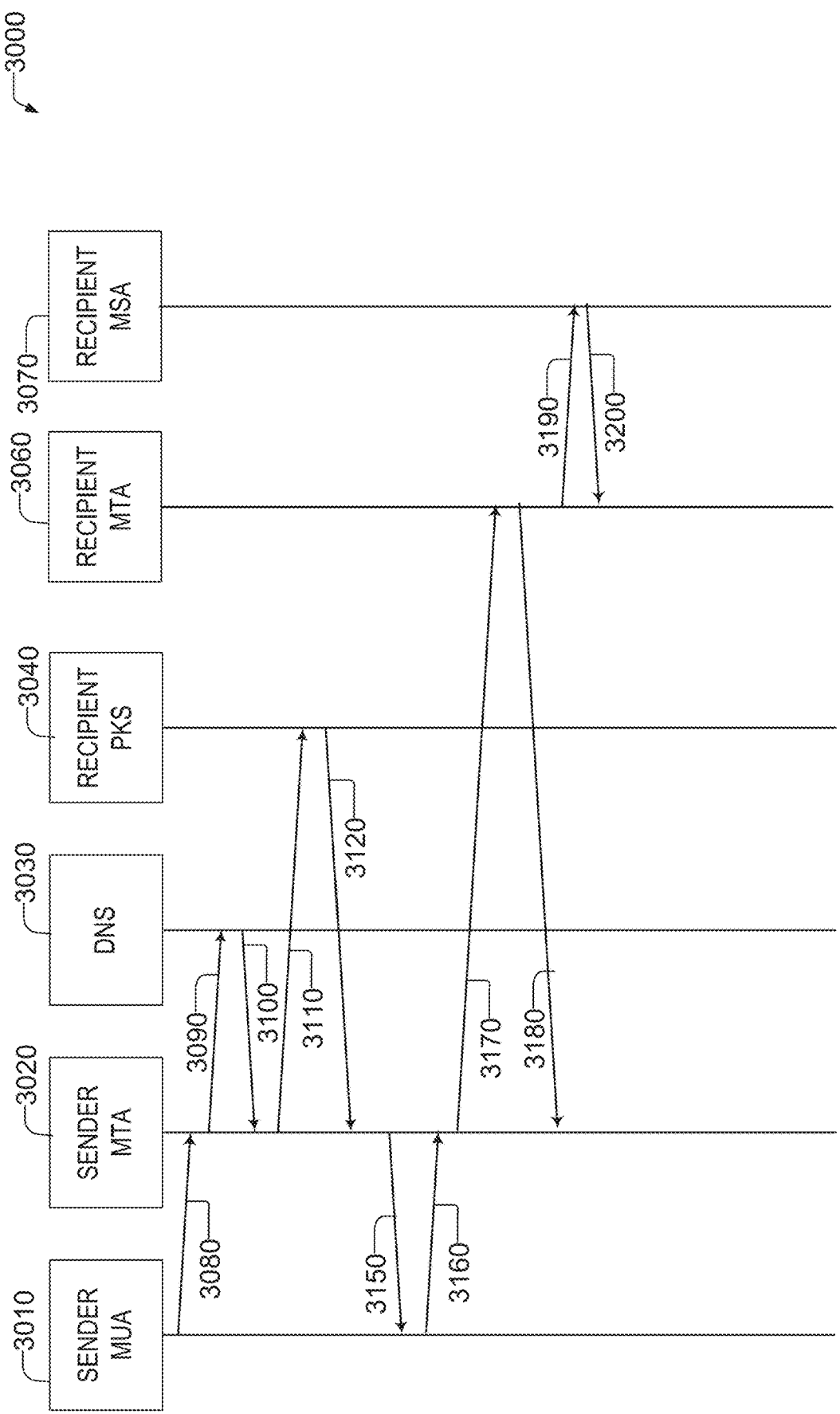
FIG. 3 shows a message sequence chart showing a mobile wallet communication according to some examples of the present disclosure.

Turning now to FIG. 3, a message sequence chart showing a mobile wallet communication is shown according to some examples of the present disclosure. Sender MUA 3010 sends a public key request 3080 to request a recipient mobile wallet's public key to the sender MTA 3020 in sender MUA 3010's mobile wallet domain. In this request the sender MUA 3010 includes the address of the recipient mobile wallet (part of the address is a mobile wallet domain name). The sender MTA 3020 may determine the Internet Protocol Address of the mobile wallet domain name using DNS 3030 via request message 3090. Response 3100 from DNS 3030 includes the address of the recipient mobile wallet's domain. Sender MTA 3020 may then cache this address for later use. In some examples, if the sender MTA 3020 already has the IP address of the recipient PKS 3040 from a previous DNS request (e.g., in its DNS cache), messages 3090 and 3100 may not be needed.

The sender MTA 3020 then uses this address to contact the recipient public key server (PKS) 3040 using message 3110 requesting the public key of the recipient. The recipient PKS 3040 may reply with the recipient's public key using message 3120. As already noted the response from the PKS 3040 may be a digital certificate issued by a trusted CA.

Sender MUA 3010 may then send a completed mobile wallet message 3160 to sender MTA 3020. This mobile wallet message may be encrypted by the sender MUA 3010 with the public key obtained at operation 3150. In some examples, the message is not unencrypted until received by the recipient MUA—as such, the message is encrypted end-to-end. Sender MTA 3020 may then pass this message 3170 to recipient MTA 3060 using the address received from DNS 3030 in message 3100. In some examples, if the time elapsed between the sender MUA 3010 requesting the public key of the recipient and the time between sending the message 3160 is too great, the sender MTA 3020's cache may have cleared and thus the sender MTA 3020 may have to re-request the Internet Protocol (IP) Address of the recipient mobile wallet domain. In other examples, the IP Address of the recipient PKS 3040 and the recipient MTA 3060 may be different and thus the sender MTA 3020 may have to make two separate DNS requests. In still other examples, the IP Address of the recipient MTA 3060 and the recipient PKS 3040 may be derivable from each other, such that if the sender MTA 3020 knows the IP address of one, it may determine the IP address of the other without a DNS query.

Recipient MTA 3060 may respond with a confirmation 3180 that this message was received and the recipient is a valid recipient mobile wallet. Recipient MTA 3060 then passes the message 3190 to recipient MSA 3070 for storage. Recipient MSA 3070 may acknowledge receipt of the message 3190 with ack message 3200.

Figure 4:
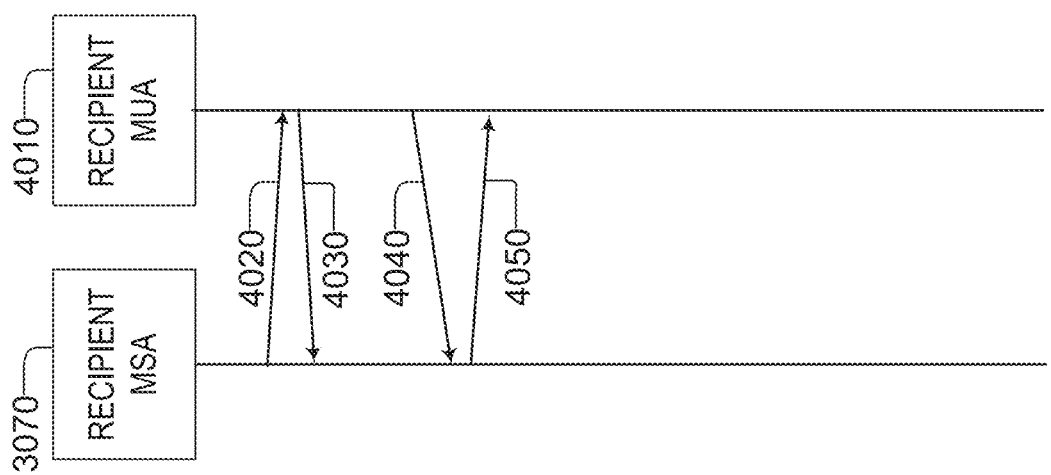
FIG. 4 shows a message sequence chart that is a continuation of FIG. 3 according to some examples of the present disclosure.

Continuing now to FIG. 4, the recipient MSA 3070 may send a message 4020 notifying the recipient mobile wallet user agent (MUA) 4010 that a message is waiting for the recipient MUA 4010. Recipient MUA 4010 may acknowledge this notification with reply message 4030. When the recipient MUA 4010 wishes to retrieve this message, recipient MUA 4010 may send a request message 4040 to the recipient MSA 3070 for the message. Recipient MSA 3070 may then send a reply 4050 with the message. Recipient MUA 4010 may then utilize its private key to decrypt and read the message. In some examples, rather than a notification, the recipient MUA 4010 may simply poll the recipient MSA 3070 periodically for new messages. In yet other examples, the recipient MSA 3070 will immediately deliver the message to the MUA 4010 unless the MUA 4010 is offline, in which case the recipient MSA 3070 will store the message until the MUA 4010 is back online (at which point it will deliver the message to the MUA 4010).

Figure 5:
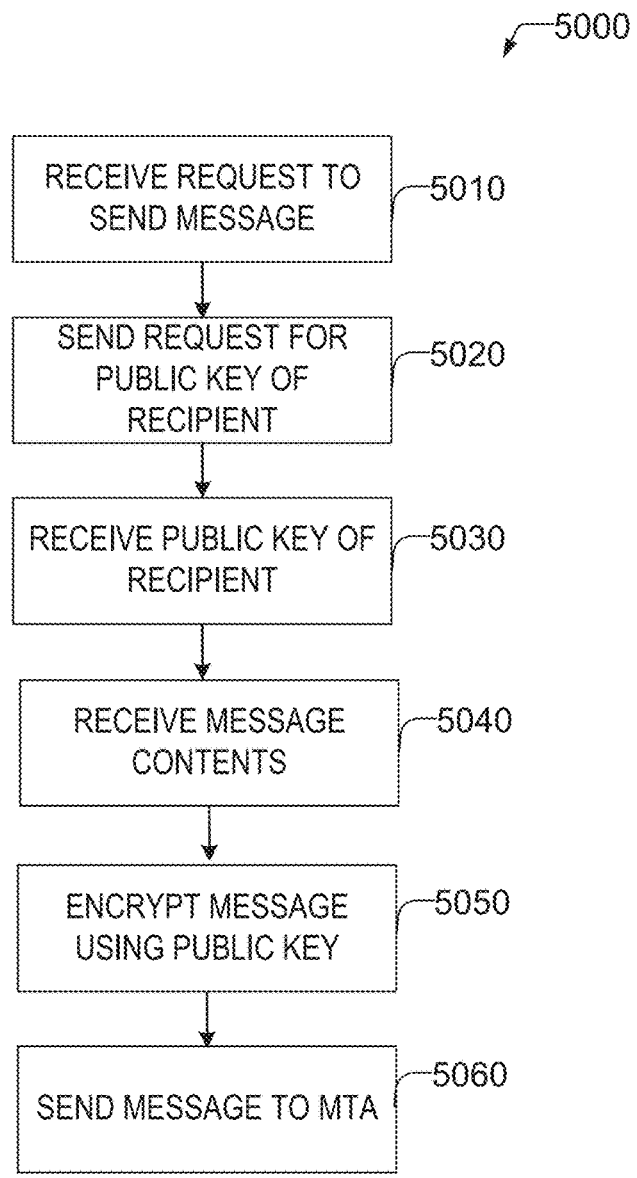
FIG. 5 shows a flowchart of a method of an MUA sending a mobile wallet message according to some examples of the present disclosure.

FIG. 5 shows a flowchart of a method 5000 of a MUA sending a mobile wallet message according to some examples of the present disclosure. At operation 5010 the MUA receives a request to send a message. For example, a user utilizing a Graphical User Interface (GUI) provided by a mobile wallet application may request to send a message. For example, the user presses a "compose" button and enters a recipient's mobile wallet address and presses a "send" button. At operation 5020, the MUA determines the recipient(s) of the message and sends a request for the public key of the recipient(s) to the MTA of the user's current mobile wallet domain. At operation 5030, the MUA receives the public keys. These public keys may be cached or stored to avoid future calls to the MTA in future messages. In some examples, the public keys may be received as a digital certificate signed by a trusted CA. The MUA may attempt to verify the digital certificate and if the verification is successful, processing may continue, otherwise, processing may terminate and the user may be notified of the unsuccessful verification.

At operation 5040 the MUA may receive the message contents of the mobile wallet to mobile wallet message. At operation 5050 the MUA may encrypt the message using the public key received at operation 5030. At operation 5060, the MUA may send the encrypted message to the MTA. In some examples, the MTA may respond to the MUA and the MUA may retransmit the message if it did not receive the acknowledgement from the MTA. If there are multiple recipients of the mobile wallet message, the message may be encrypted and sent separately for each recipient.

Figure 6:
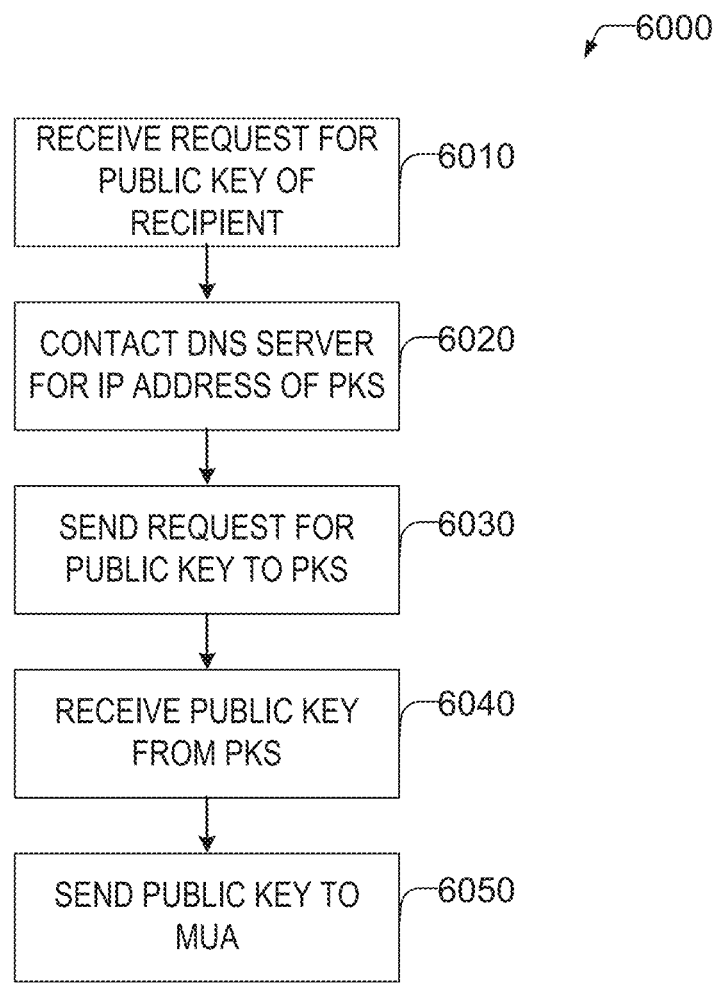
FIG. 6 shows a flowchart of a method of a MTA requesting a public key of a recipient mobile wallet according to some examples of the present disclosure.

FIG. 6 shows a flowchart of a method 6000 of a MTA requesting a public key of a recipient mobile wallet according to some examples of the present disclosure. At operation 6010 the MTA may receive a request for a public key of a recipient from an MUA. At operation 6020 the MTA may contact a Domain Name Server (DNS) for the IP address of the Public Key Server (PKS) of the recipient mobile wallet domain. At operation 6030 the MTA sends a request to the PKS of the recipient's mobile wallet domain. At operation 6040 the MTA receives the public key from the PKS. At operation 6050 the MTA sends this public key to the MUA.

In some examples, the MTA may cache or otherwise store DNS responses. If the MTA already has the IP address of the recipient mobile wallet domain's PKS, operations 6020 and 6030 may be omitted. Additionally, the method shown is utilized to retrieve a key for a remote mobile wallet domain. If the recipient is in the same mobile wallet domain as the sender (and also the MTA), then operations 6020 and 6030 are also not needed, and the PKS in operation 6030 is the local mobile wallet domain's PKS. Furthermore, the MTA may also cache public keys of recipient devices so as to instantly provide these keys to requesting MUAs in their mobile wallet domain. If the public key is cached (and the cache is not expired), then operations 6020-6040 are not necessary.

Figure 7:
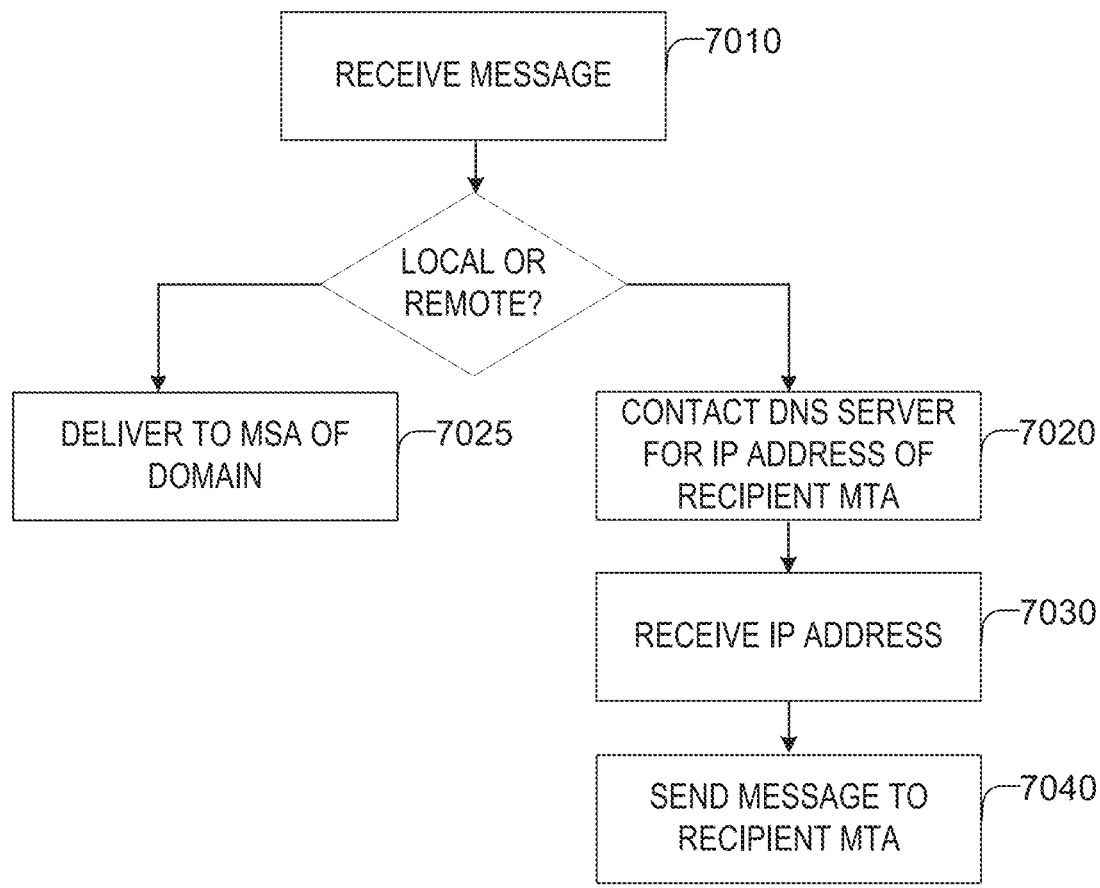
FIG. 7 shows a flowchart of a method of a MTA sending a message to another MTA according to some examples of the present disclosure.

FIG. 7 shows a flowchart of a method 7000 of a MTA sending a message to another MTA according to some examples of the present disclosure. At operation 7010 the MTA may receive a completed message for sending to another mobile wallet. This message may be encrypted, however, the header identifies its destination. If the message is to another mobile wallet in the same mobile wallet domain, the MTA delivers the message to the message storage agent of the mobile wallet domain at operation 7025. Otherwise, at operation 7020, the MTA may contact the DNS server for the IP address of the recipient MTA. In some examples, if the MUA previously requested the public key, it's possible that the DNS record is cached and this operation is not needed. At operation 7030 the IP address is received. At operation 7040, the message is sent to the IP address received at operation 7030. In some examples, the message may be sent using standard Internet protocols such as Internet Protocol (IP), Transmission Control Protocol (TCP), HyperText Transfer Protocol (HTTP), Simple Mail Transfer Protocol (SMTP), and the like.

Figure 8:
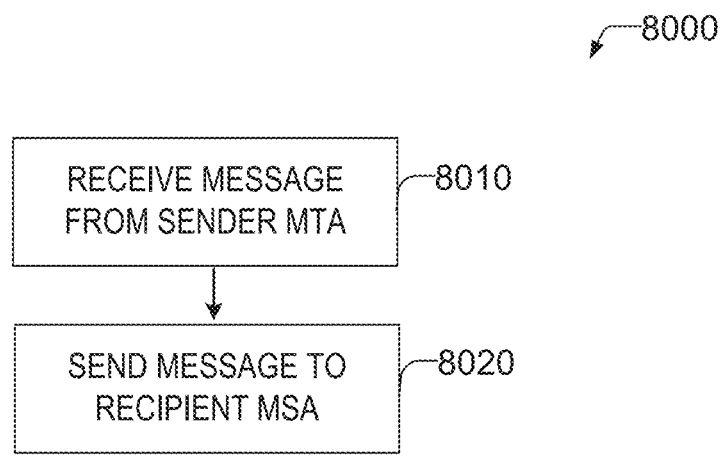
FIG. 8 shows a flowchart of a method of an MTA receiving a message sent by another MTA according to some examples of the present disclosure.

FIG. 8 shows a flowchart of a method 8000 of an MTA receiving a message sent by another MTA according to some examples of the present disclosure. At operation 8010 the MTA receives the message from the sender MTA. At this point the MTA may verify that the intended recipient is registered with the mobile wallet domain and is a proper recipient. If the MTA is a proper recipient, then at operation 8020 the message is sent to the recipient MSA for storage.

Figure 9:
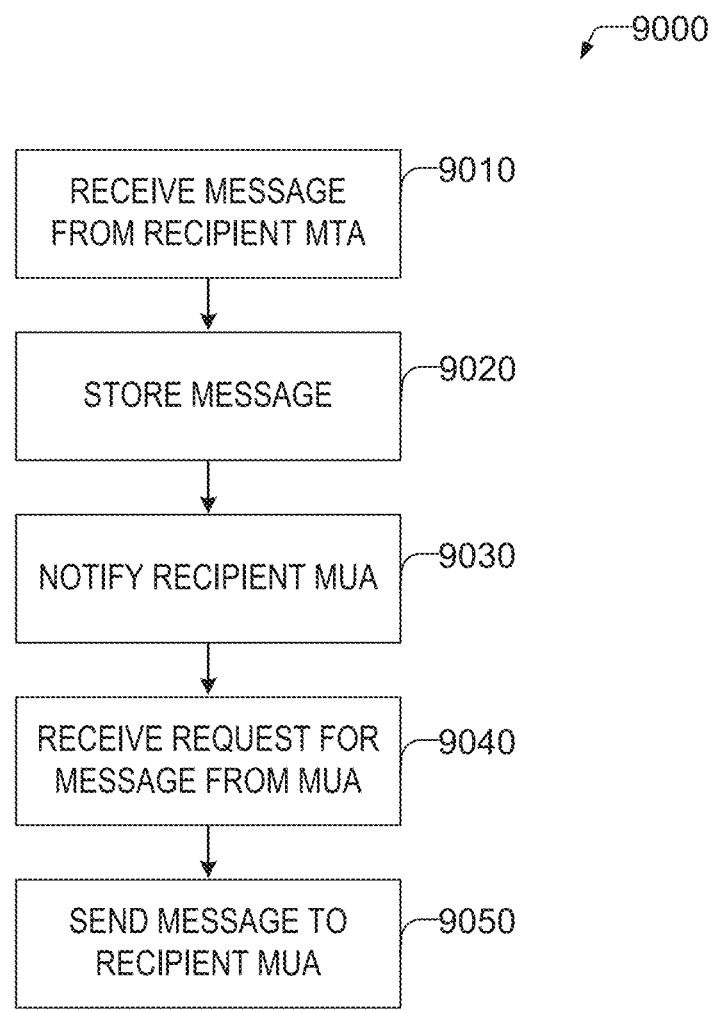
FIG. 9 shows a flowchart of a method of a recipient MSA receiving a message according to some examples of the present disclosure.

FIG. 9 shows a flowchart of a method 9000 of a recipient MSA receiving a message according to some examples of the present disclosure. At operation 9010 an MTA sends the MSA a message destined for a mobile wallet in the MSA's mobile wallet domain. The MSA stores the message at operation 9020. This may be a storage device, a database, or the like. At operation 9030 the recipient MUA of the recipient's computing device is notified. For example, the MUA may register its address with the MSA to be notified of new communications. The notification may be a message sent over a network to the MUA. The MUA may then respond by downloading the message. At operation 9040 the MUA may request the message. This request may include one or more verifications to ensure that only the recipient MUA is allowed to access the message. At operation 9050 the message is sent to the recipient MUA. In some examples, once the message is delivered the message may be deleted from storage. In other examples, the message may be retained for later downloading.

Figure 10:
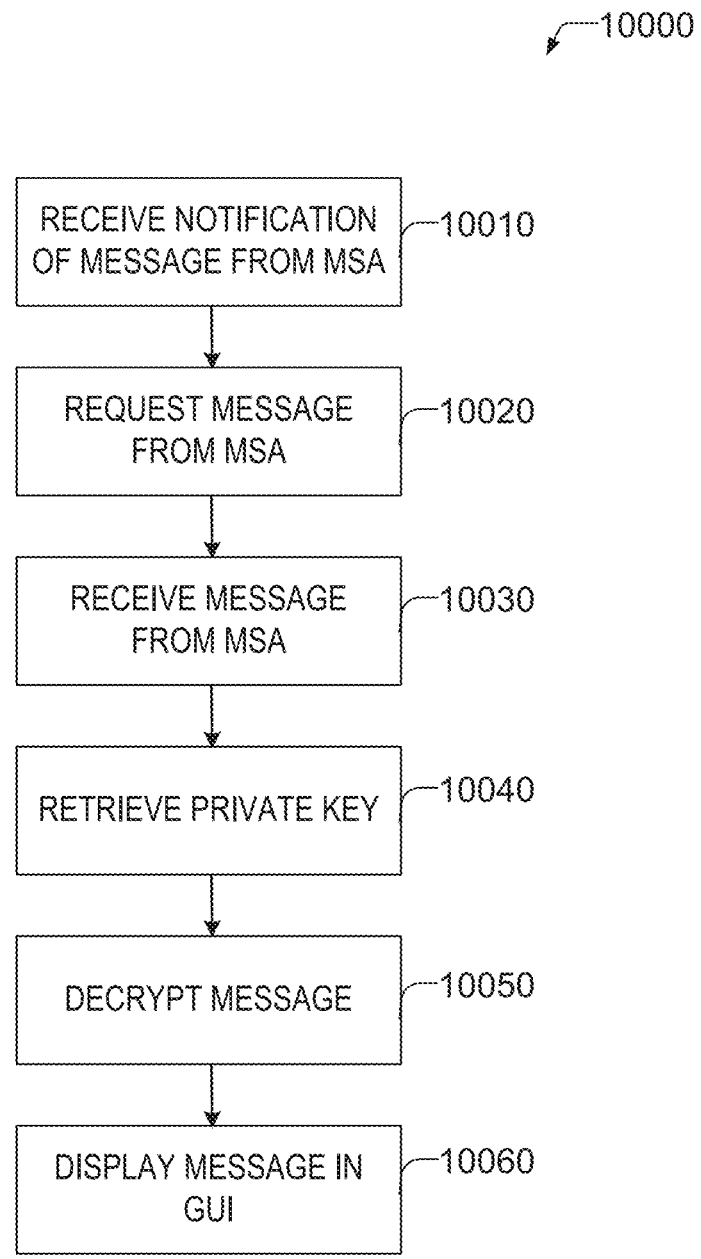
FIG. 10 shows a flowchart of a method of a recipient MUA receiving a message is shown according to some examples of the present disclosure.

Turning now to FIG. 10, a flowchart of a method 10000 of a recipient MUA receiving a message is shown according to some examples of the present disclosure. At operation 10010 the recipient MUA may receive a notification from the MSA in its mobile wallet domain. At operation 10020 the MUA may request the message from the MSA. Operation 10020 may happen much later than the receipt of the notification at operation 10010. For example, the MUA may wait for a user to indicate that they are interested in viewing the message before retrieving it. At operation 10030 the message may be received from the MSA. At operation 10040, the private key of the MUA is retrieved. The private key may be stored by the MUA, or may be in the key keeper. At operation 10050 the message may be decrypted. This may also happen later. For example, the MUA may download the message immediately, but store it encrypted on the computing device of the user. In some examples, the MUA may only decrypt the message upon receiving a request to view the message by the user. This may protect the message by storing it encrypted. At operation 10060 the message may be displayed to a user, such as in a GUI provided by the mobile wallet application. In other examples, the message may trigger one or more payments, deductions from balances, or other actions.

Public and private keys for a mobile wallet used by the present disclosure may be generated by a key manager component of the mobile wallet application. In these examples the public key is then communicated to the public key server provided by the mobile wallet provider for distribution to other mobile wallets. In some examples, the private key may be encrypted by another cryptographic key from another cryptographic key pair and stored with the mobile wallet domain administrator. This allows for a backup of the private key without allowing the mobile wallet domain administrator access to the key (and thus access to the mobile wallet messages). The key used to unlock the first private key may be stored in the mobile wallet application. For reliability, in case the mobile wallet application is erased (e.g., a failure of the computing device it is run on), the mobile wallet may store this key in a key keeper, such as key keeper 2300 of FIG. 2. Key keeper 2300 may be an application on another computing device of the user, a network based application, or the like, which may not be the mobile wallet provider. The transmissions of the keys to the key keeper may be protected through one or more mechanisms such as secure socket layer (SSL) communications and may be protected from unauthorized access through mechanisms such as username and password and two factor authentication. If the mobile wallet loses keys due to device failure or device replacement, it retrieves the second cryptographic key from the key keeper and the encrypted private key from the administrator. The device then recovers the private key by decrypting it using the second cryptographic key.

In some examples, the recipient may verify the identity of the sending mobile wallet. This may be important to maintaining security when processing financial transactions electronically without human intervention. For instance, the recipient mobile wallet may receive a monthly electric bill from a power company and may verify authenticity of the bill by verifying the sender of the bill before making a payment automatically. In some examples, the sender may sign the message with a digital signature. For example, the message is hashed and the hash value is then encrypted with the sender's private key. The sender's public key is then used by the recipient (after having been obtained by the recipient's MTA) to verify the hash of the message. This verifies that the message is from the sender. However, in other examples, an additional verification may be sent. For example, non-public details about the recipient's account may also be sent to provide the recipient with an assurance that the message is genuine. Using these two techniques the recipient may be assured of the sender's legitimacy.

Figure 11:
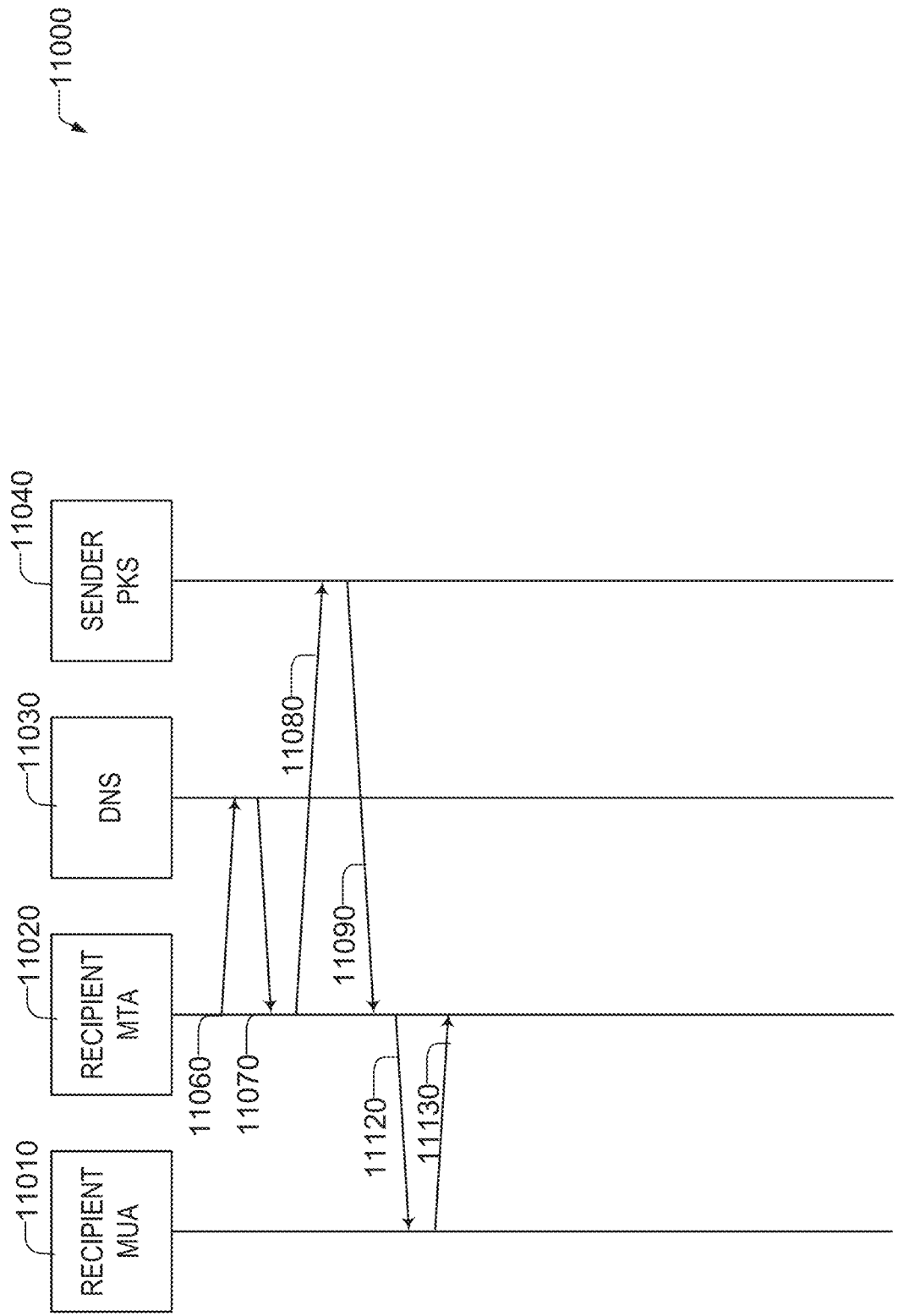
FIG. 11 shows an example message sequence chart of a recipient MTA verifying the authenticity of the sender.

FIG. 11 shows an example message sequence chart 11000 of a recipient MTA verifying the authenticity of the sender. This flow may happen after the MTA receives the message. First the recipient MTA may identify the sender name in the message. Recipient MTA 11020 may send a DNS lookup request 11060 for the sender name identified in the message to DNS 11030 to obtain the IP address of the senders PKS. At operation 11070 the DNS server 11030 responds with the IP address (or an error if the mobile wallet domain was not found—in which case the flow ends). If the IP address of the message sender is different from the IP address of the sender identified in the message, the message may be from a fraudulent sender. For instance, suppose the sender is an imposter of Wells Fargo. When the recipient performs DNS lookup of Wells Fargo, the IP address of Wells Fargo would be different from the imposter's IP address. In other examples, the IP address may be deducible from the received message (e.g., from analysis of IP-packet or mobile wallet message headers) and messages 11060 and 11070 may not be necessary.

The recipient MTA 11020 may then send a request for the public key of the sender from the sender's PKS using message 11080. The sender PKS 11040 may then reply 11090 with the public key. In some examples, the public key provided may be as part of a digital certificate issued by a trusted certificate authority.

Once the recipient MTA 11020 receives the sender's public key, the recipient MTA 11020 may verify the certificate (e.g., if the public key was provided as a digital certificate), decrypt the signature, calculate the message hash and compare the decrypted signature hash with the calculated message hash. If the hashes match, then the message was sent by the sender. If the hashes do not match, it is possible that the sender did not send the message. Message 11120 may be an indication of whether the sender is legitimate. Message 11130 may acknowledge message 11120.

In other examples, the verification is done by the recipient MUA 11010. In these examples message 11120 is the digital certificate or public key. The recipient MUA 11010 may verify the certificate (e.g., if the public key was provided as a digital certificate), decrypt the signature, calculate the message hash and compare the decrypted signature hash with the calculated message hash. If the hashes match, then the message was sent by the sender. If the hashes do not match, it is possible that the sender did not send the message. In either case, the recipient MUA 11010 may inform the user on the results of the verification.

Figure 12:
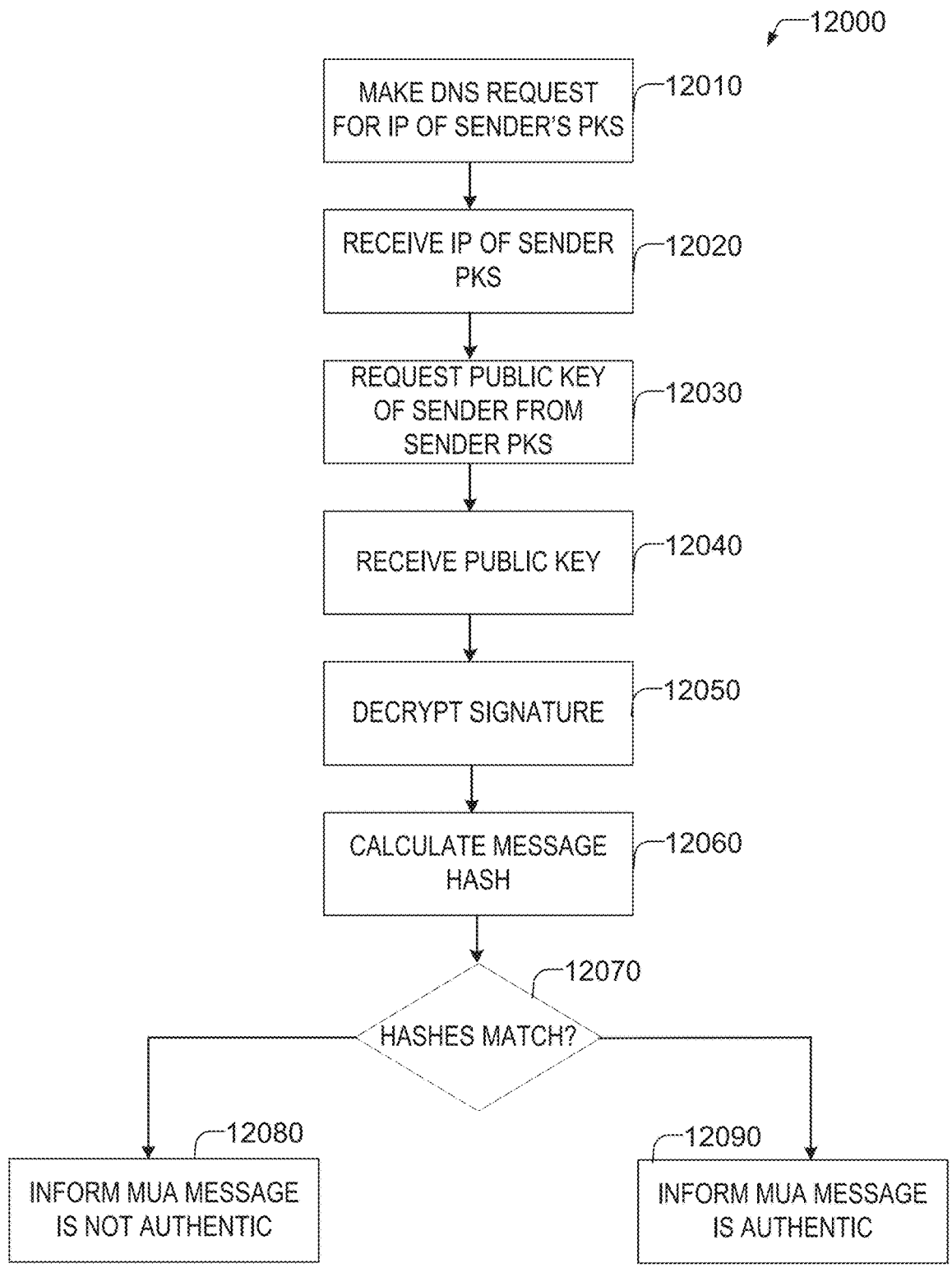
FIG. 12 shows a flowchart of a method for verifying the sender of a mobile wallet message is shown according to some examples of the present disclosure.

Turning now to FIG. 12, a flowchart of a method 12000 for verifying the sender of a mobile wallet message is shown according to some examples of the present disclosure. At operation 12010 the recipient's MTA may request the IP of the sender's PKS. At operation 12020 the recipient's MTA may receive the IP of the sender's PKS. As noted previously, the DNS lookup may not be necessary if the IP Address is available from the original message or from other sources (e.g., a cache).

At operation 12030 the recipient's MTA may request the sender's public key from the PKS of the sender. At operation 12040 the MTA may receive the public key. Also as previously noted, the public key may be in the form of a digital certificate issued by a trusted certificate authority.

Operations 12050-12090 may be performed by either the MTA of the recipient, or the recipient MUA. In some examples, before operations 12050-12090, the public key of the sending MUA may be verified by verifying the digital certificate using the public key of the certificate authority that issued the digital certificate, by verifying it has not expired, and verifying that the identity of the user is as stated by the sender.

At operation 12050 the signature of the message may be decrypted. At operation 12060 a cryptographic hash value of the message may be computed using a cryptographic hash function. The sender had calculated the cryptographic hash utilizing the same hashing function, encrypted it with its private key (which only the sender has, and only the valid public key can decrypt) as the signature, and sent it to the recipient. If the signature is decrypted with the public key and matches the correct cryptographic hash, then the recipient can be assured that the message came from the person holding the private key matching the public key registered with the PKS and verified by the CA. Example cryptographic hash functions include MD5, SHA-1, SHA-2, SHA-3, BLAKE, BLAKE2, and the like. At operation 12070 if the hash in the message matches the computed hash value, then at operation 12090 the MTA may notify the MUA that the message is authentic. At operation 12080, if the hash in the message does not match the computed hash value, then the MTA may inform the MUA that the message is not authentic (and may be considered suspicious).

While the above procedure ensures that the entity that sent the message also knows the private key of the public key associated with the entity, it is possible that the private key was compromised. In order to add another layer of security, in some examples an application layer security mechanism may be added. In this layer, the MUA of the recipient may require the MUA of the sender to provide certain verification information. For example, the MUA of recipient may request information known to both the MUA of the sender and MUA of the recipient. If the MUA of the sender provides this information (in either the original message, or as part of a challenge response sequence) and it is correct, the MUA of the recipient may determine that the sender is legitimate. Example information may include one or more of: bank account information (account numbers, balances, account holder personal information such as name, address, phone number), transaction information (e.g., transaction dates, amounts, parties), driver's license information, user information, and a secret phrase (e.g., a predetermined data field). The information requested may be standardized, such that the sender may provide this information as part of the message; or may be requested by the MUA of the recipient.

Both levels of verification (e.g., verifying the signature of the sender, as well as application-layer verifications) may be performed automatically, or may be performed at the request of the recipient. In some examples, certain types of messages (e.g., certain mobile wallet messages such as transactions) may automatically trigger one or both of the verification layers. In some examples, a table may indicate whether no verification, signature verification, application layer verification, or both signature and application layer verification is to be performed based upon one or more of: the type of mobile wallet message, a text content of the mobile wallet message, a sender of the mobile wallet message, or the like.

Figure 13:
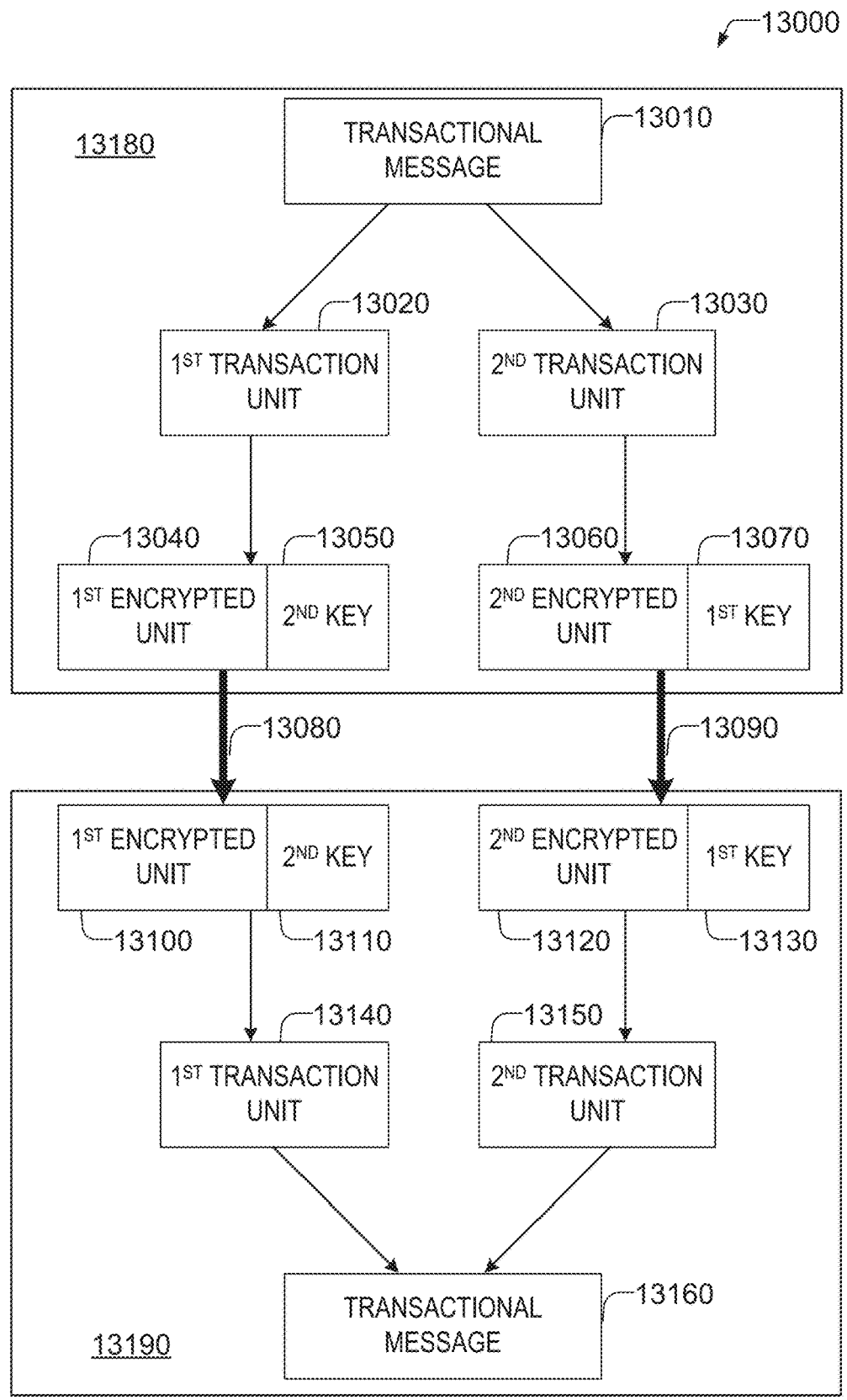
FIG. 13 shows an example message sequence chart of a secured transmission of a mobile wallet message from a sender to a recipient.
Figure 14:
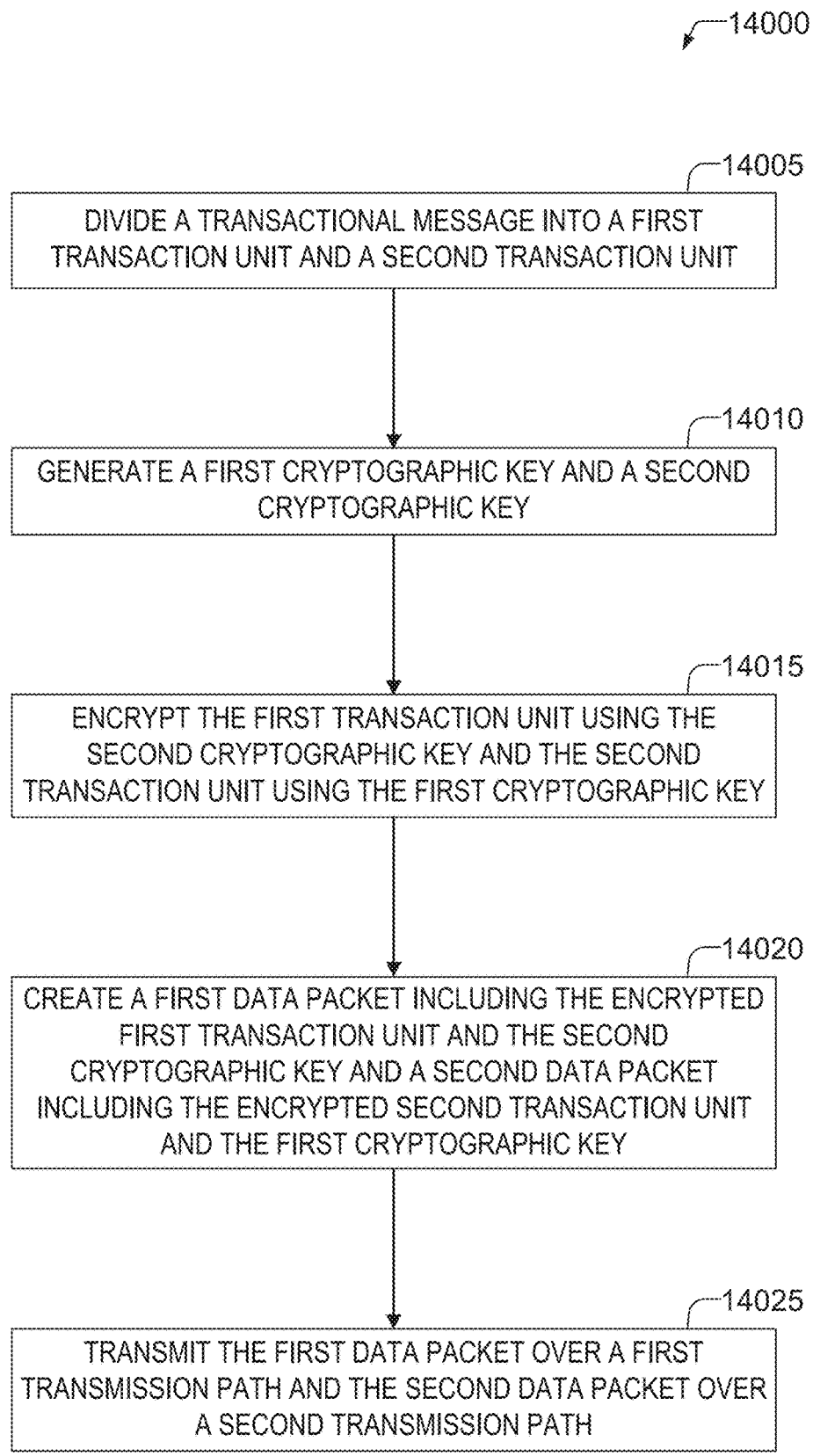
FIG. 14 shows a flowchart of a method for securing mobile wallet message transmissions between a sender and a recipient according to some examples of the present disclosure.

Mobile wallets may use alternative security scheme in some cases to maintain the integrity of transmitted messages. For instance, a sender mobile wallet may discover that there is no public key published by the recipient mobile wallet in the process of DNS lookup. The sender may still want to send a message with some protection against the man-in-the-middle attack. FIGS. 13-15 illustrate an example of a security scheme for securing messages transmitted between mobile wallets, according to some embodiments.

FIG. 13 shows an example message sequence chart 13000 of a secured transmission of a mobile wallet message from a sender to a recipient. A first mobile wallet (sender) 13180 may compose a transactional message 13010 and may divide it into a first transaction unit 13020 and a second transaction unit 13030. The first transaction unit 13020 may include a first half of the transactional message and the second transaction unit 13030 may include a second half of the message. In an example, the first transaction unit 13020 may include odd lines of the transactional message 130101 and the second transaction unit 13030 may include even lines of the transactional message 130101. It will be recognized that the transactional message 13010 may be divided in a variety of other ways.

The first mobile wallet 13180 may create two different cryptographic keys and may encrypt the first transaction unit 13020 with a first key 13070 to produce a first encrypted unit 13040 and may encrypt the second transaction unit 13030 with a second key 13050 and may produce a second encrypted unit 13060. The first mobile wallet 13180 may produce a first packet by combining the first encrypted unit 13040 and the second key 13050 and may produce a second packet by combining the second encrypted unit 13060 and the first key 13070. Each packet may specify the relationship with the other packet. The first mobile wallet 13180 may transmit the first packet using a first communication path 13080 and may transmit the second packet using a second communication path 13090. The first communication path 13080 is different from the second communication path 13090. For example, the first communication path 13080 and the second communication path 13090 may operate on two different wireless media or two different underlying networks (e.g., separate network backbones, etc.). For example, the first communication path 13080 may be a cellular network and the second communication path 13090 may be a Wi-Fi network. In another example, the first communication path 13080 may be a telephone company network and the second communication path 13090 may be the Internet.

The second mobile wallet (recipient) 13190 may receive the first packet via the first communication path 13080 and the second packet via the second communication path 13090. The second mobile wallet 13190 may decrypt the first encrypted unit 13100 included in the first packet using the first cryptographic key 13130 and may decrypt the second encrypted unit 13120 included in the second packet using second key 13110 and may produce a first transaction unit 13140 and a second transaction unit 13150 and may combine the first transaction unit 13140 and the second transaction unit 13150 into a transactional message 13160.

In some examples, the first mobile wallet 13180 may divide the transactional message 13010 into more than two units, encrypt each unit using a different cryptographic key for each unit, and send each data unit over two or more communication paths at different time intervals. In an example, each unit may be numbered or their relationships may be defined to enable recombination.

If one of the packets is lost on the way, the second mobile wallet 13190 may transmit a request to the first mobile wallet 13180 to retransmit the data packets. In an example, the first mobile wallet 13180 may use a different division technique and may use different encryption keys from the first attempt to insure the security of the second attempt.

A recipient may receive a first encrypted segment of the transactional message and may need a cryptographic key included in a packet with a second encrypted segment of the transactional message. Because each segment is encrypted with a key included in another segment and each segment is transmitted over a different communication path at a different time interval, the likelihood of the message being intercepted or compromised (e.g., via a man-in-the-middle attack, etc.) may be reduced.

FIG. 14 shows a flowchart of a method 14000 for securing mobile wallet message transmissions between a sender and a recipient according to some examples of the present disclosure.

At operation 14005, a first mobile wallet (e.g., mobile wallet application 2060 as described in FIG. 2) may divide a transactional message into a first transaction unit and a second transaction unit. In an example, the first mobile wallet may determine a first half and a second half of the transactional message and may include the first half in the first transaction unit and may include the second half in the second transaction unit. In another example, the first mobile wallet may extract odd lines and even lines from the transactional message and may include the odd lines in the first transaction unit and may include the even line in the second transaction unit.

At operation 14010, the first mobile wallet may generate (e.g., using the key manager 2080 as described in FIG. 2) a first cryptographic key and a second cryptographic key. In an example, the first cryptographic key and the second cryptographic key may be different.

At operation 14015, the first mobile wallet may encrypt (e.g., using the MUA 2075 as described in FIG. 2) the first transaction unit using the second cryptographic key and the second transaction unit using the first cryptographic key.

At operation 14020, the first mobile wallet may create (e.g., using the MUA 2075 as described in FIG. 2) a first data packet including the encrypted first transaction unit and the second cryptographic key and a second data packet including the encrypted second transaction unit and the first cryptographic key. In an example, the first data packet may include a reference to the second data packet and the second data packet may include a reference to the first data packet.

At operation 14025, the first mobile wallet may transmit (e.g., using the MUA 2075 as described in FIG. 2) the first data packet over a first transmission path and the second data packet over a second transmission path. In an example, the first transmission path may use a first wireless protocol and the second transmission path may use a second wireless protocol. In another example, the first transmission path may use a first physical network and the second transmission path may use a second physical network. In another example, the first transmission path may use a cellular network and the second communication path may use a Wi-Fi network. In another example, the first communication path may use a telephone company network and the second transmission path may use an internet connection.

In some examples, the first mobile wallet may receive a request from a second mobile wallet (e.g., mobile wallet application 2070 as described in FIG. 2) indicating that one of the first data packet and the second data packet was not received. The first mobile wallet may retransmit the first data packet and the second data packet in response to the request. In an example, the first mobile wallet may generate a third cryptographic key and a fourth cryptographic key and may encrypt the first transaction unit using the fourth cryptographic key and the second transaction unit using the third cryptographic key before retransmitting the first data packet and the second data packet.

FIG. 15 shows a flowchart of a method 15000 for securing mobile wallet message transmissions between a recipient and a sender according to some examples of the present disclosure.

At operation 15005, a mobile wallet user agent (MUA) of second mobile wallet (e.g., the MUA 2260 of mobile wallet application 2070 as described in FIG. 2) may receive a first data packet over a first transmission path and a second data packet over a second transmission path, the first data packet including a first encrypted transaction unit and a second cryptographic key and the second data packet including a second encrypted transaction unit and a first cryptographic key. In an example, the first data packet may include a reference to the second data packet and the second data packet may include a reference to the first data packet. In an example, the first transmission path may use a first wireless protocol and the second transmission path may use a second wireless protocol. In another example, the first transmission path may use a first physical network and the second transmission path may use a second physical network. In another example, the first transmission path may uses a cellular network and the second communication path may use a Wi-Fi network. In another example, the first communication path may use a telephone company network and the second transmission path may use an internet connection.

At operation 15010, the MUA may decrypt (e.g., using the key manager 2290 as described in FIG. 2, etc.) the first encrypted transaction unit using the second cryptographic key and the second encrypted transaction unit using the first cryptographic key.

At operation 15015, the MUA may combine the first decrypted transaction unit and the second decrypted transaction unit into a transactional message.

At operation 15020, the MUA may forward the transactional message to the second mobile wallet for further processing.

In some examples, the MUA may determine that only one data packet of the first data packet and the second data packet has been received. The MUA may transmit a request to resend the first data packet and the second data packet to a sender (e.g., mobile wallet application 2060 as described in FIG. 2) of the only data packet. The MUA may receive the first data packet and the second data packet in response to the request.

Figure 16:
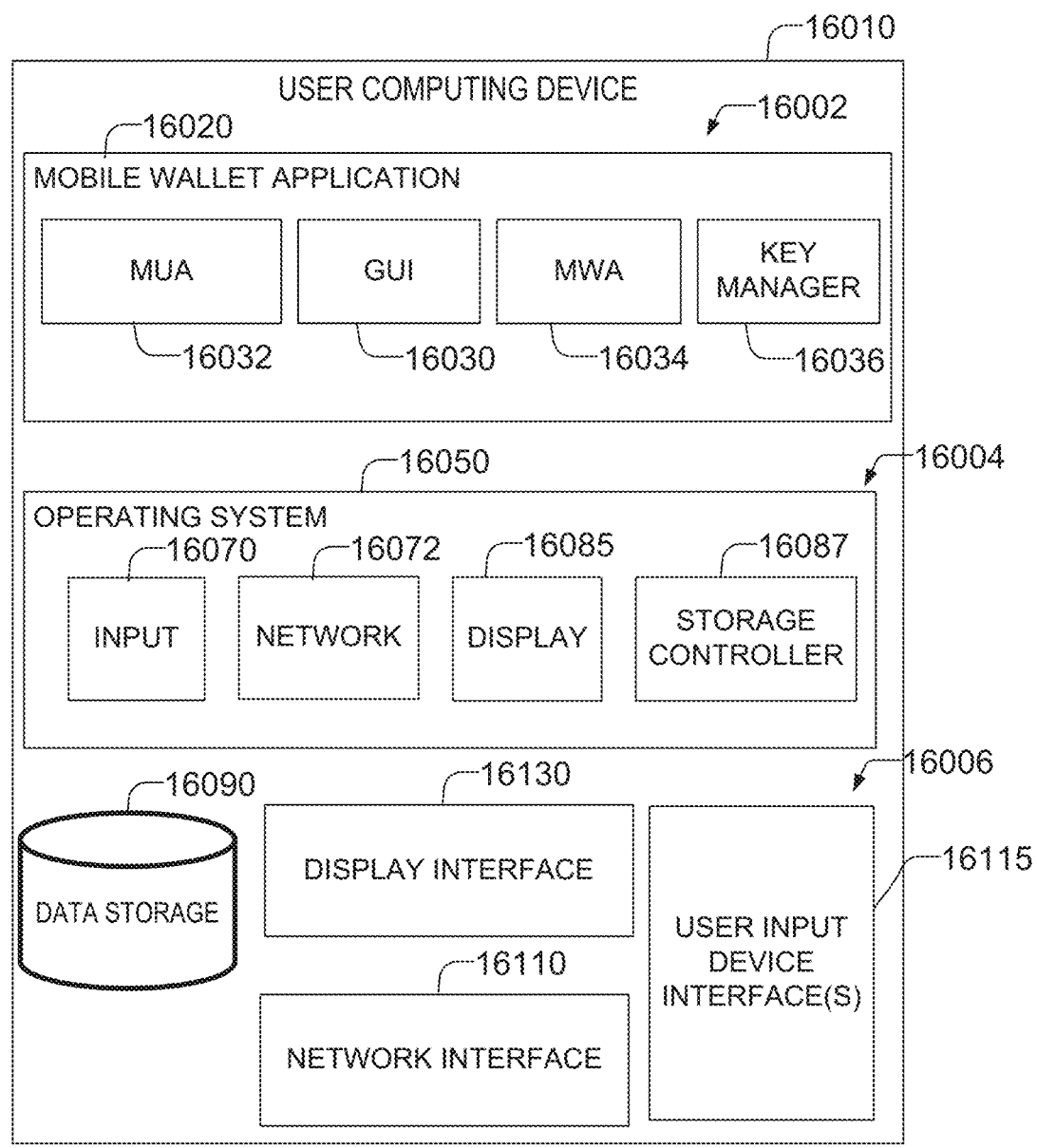
FIG. 16 shows a schematic of a logical diagram of a user computing device according to some examples of the present disclosure.

FIG. 16 illustrates a schematic of a logical diagram of a user computing device 16010 according to some examples of the present disclosure. For example, user computing device 16010 may, in some examples, be an embodiment of computing devices 1040, 1050, 2040, and 2050. User computing device 16010 may implement a sender MUA 3010, a recipient MUA 4010, or a recipient MUA 11010. User computing device 16010 may implement FIGS. 5, 10, and portions of FIGS. 12, 14, and 15. User computing device 16010 may be a desktop computer, laptop computer, tablet computer, mobile phone, smartphone, computer server, or wearable. User computing device may have a hardware layer 16006 including display interface 16130, network interface 16110, user input device interface(s) 16115, and data storage 16090. User computing device 16010 may have an operating system layer 16004 with one or more operating system(s) such as operating system 16050. Operating system 16050 may have, among other modules, an input module 16070, a network module 16072, a display module 16085, and a storage controller module 16087. User computing device may have an application layer 16002. Application layer 16002 may have many applications, but as shown, application layer includes a mobile wallet application 16020. User computing device may have other layers (such as a Basic Input and Output System (BIOS), Unified Extensible Firmware Interface (UEFI), Firmware layer), and the like which are not shown for clarity.

Included in mobile wallet application 16020 is MUA module 16032 which implements the mobile wallet user agent, such as MUA 2075, 2260, 3010, 4010, 11010, and implements the methods of FIGS. 5, 10, and all of, or portions of FIG. 12. MUA module 16032 may provide one or more graphical user interfaces for creating, editing, sending, or reading mobile wallet messages. MUA module 16032 may also provide for communicating with one or more MTA's to obtain encryption keys of recipient mobile wallets, encrypting one or more messages with obtained encryption keys, sending one or more messages (e.g., encrypted messages) to the one or more MTA's, receiving notifications that one or more messages sent to the MUA are available at an MSA, retrieving the one or more messages from the MSA, decrypting the one or more messages, managing the public and private keys of the mobile wallet, and the like. MUA module 16032 may interface with the GUI module 16030 to provide one or more GUIs to facilitate the mobile wallet messaging. MUA module 16032 may also interface with the input module 16070 of operating system 16050 to receive user input from devices connected to the user computing device 16010 through user input device interface(s) 16115 and with display module 16085 to provide output to the user through display interface 16130 in providing these GUIs.

Mobile Wallet Application (MWA) module 16034 provides for storing, managing, and using items in the mobile wallet. For example, MWA module 16034 may, upon input from the user, transmit one or more payment authorizations to other devices, transmit identification information to other users, store, modify, or delete items in a user's wallet, and the like. MWA module 16034 may also work with GUI module 16030 to provide one or more GUIs to facilitate the management of the mobile wallet by interfacing with the input module 16070 and display module 16085.

Also included in mobile wallet applications 16020 is a GUI module 16030 which, as noted, may work with display module 16085, input module 16070, MUA module 16032, and MWA module 16034 to provide one or more GUIs for allowing users to use their mobile wallet and to send messages from and receive messages to their mobile wallets. For example, GUI module 16030 may allow users to view representations of the contents of their mobile wallets, edit their mobile wallets, add items, remove items, modify items, use items (e.g., for payment, for identification, and the like), and send and receive messages to and from other mobile wallets. Key manager module 16036 may obtain, store, and manage one or more cryptographic keys or key pairs. Key manager module 16036 may be an embodiment of key manager 2080 and 2290. Key manager module 16036 may work with the storage controller 16087 to store keys in the data storage 16090. Key manager module 16036 may also work with storage controller module 16087 to obtain keys, certificates, or other cryptographic items from one or more remote servers.

Operating system layer 16004 provides one or more services to the application layer 16002 and manages hardware in the hardware layer 16006. Example tasks performed by the operating system layer 16004 includes providing one or more device drivers which manages hardware and provides one or more interfaces for applications in the application layer 16002 to utilize the hardware in the hardware layer 16006. Other tasks performed by the operating system layer 16004 include memory management, task scheduling, resource management, optimizations, security, and other tasks.

Input module 16070 is a device driver that manages user input device interface(s) 16115 and provides input sensed by devices connected to the user input device interface(s) 16115 to interested modules in the operating system layer 16004 and interested applications in the application layer 16002. Display module 16085 is a device driver that manages display interface 16130 and provides modules in the operating system layer 16004 and applications in application layer 16002 access to displays connected to the display interface 16130. Storage controller module 16087 is a device driver that manages data storage 16090 and provides modules in the operating system layer 16004 and applications in application layer 16002 access to store and retrieve data in data storage 16090. For example, storage controller module 16087 may provide mobile wallet application(s) 16020 with access to data storage 16090 for storing messages, storing cryptographic keys (e.g., key manager 16036 may store keys for the user of mobile wallet application(s) or may cache one or more public keys of other mobile wallet users to avoid asking the MTA for keys, and the like), etc.

Network module 16072 is a device driver for the network interface 16110. Network module 16072 may manage network interface 16110 and provide network access to modules in the operating system layer 16004 and application layer 16002. Network module 16072 may implement one or more network protocols, such as Transmission Control Protocol (TCP), Internet Protocol (IP), 802 series protocols promulgated by the Institute of Electrical and Electronics Engineers (IEEE) including 802.11 protocols and 802.3 protocols, cellular protocols such as those promulgated by the Third Generation Partnership Project (3GPP) including Long Term Evolution (LTE) protocols and Long Term Evolution-Advanced (LTE-A) protocols, and others.

Data storage 16090 may be any type of non-transitory storage, such as Random Access Memory (RAM), Solid State Drives (SSD), Hard Disk Drivers (HDD), magnetic storage, and optical storage. Display interface 16130 may be graphics hardware that connects to a Cathode Ray Tube (CRT), a Liquid Crystal Display (LCD), a Light Emitting Diode (LED) display, an Organic LED display, or the like. Display interface 16130 may be coupled to one or more user input devices to form a touch screen display. User input device interface(s) 16115 may be any interface to a user input device. Examples include Universal Serial Bus (USB), Serial ATA (SATA), Peripheral Component Interconnect Express (PCI-E), and the like. Input devices that may connect to the user input device interface(s) 16115 may include touch sensors (e.g., in a touch screen display), a keyboard, a mouse, a trackpad, a touchpad, and the like. Network interface 16110 may provide user computing device 16010 with access to one or more computer networks. Network interface 16110 may be an Ethernet card, a Wireless Local Area Network (WLAN) card, a Radio Frequency Transmitter, or the like.

Figure 17:
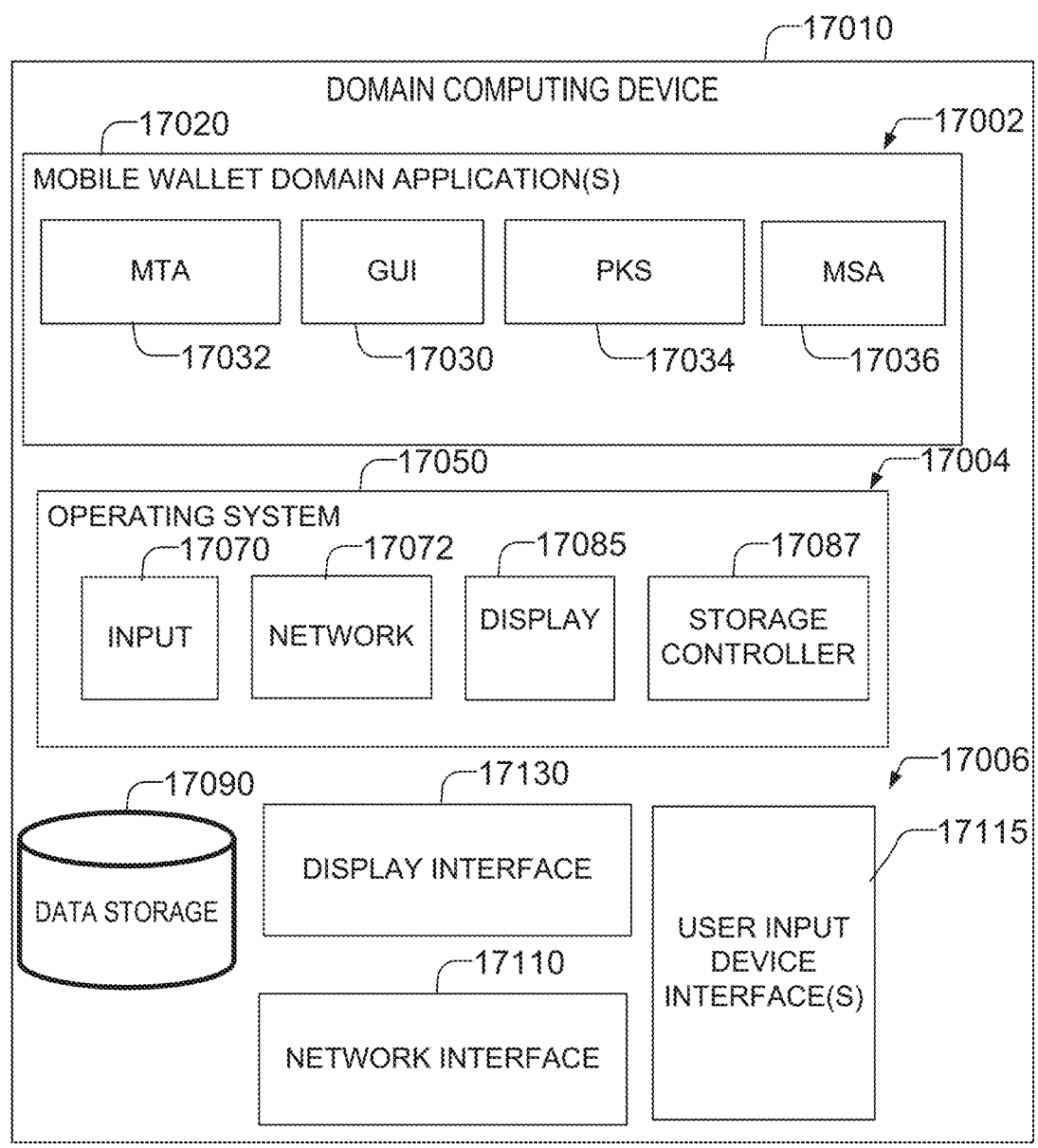
FIG. 17 shows a schematic of a mobile wallet domain computing device according to some examples of the present disclosure.

FIG. 17 illustrates a schematic of a mobile wallet domain computing device 17010 according to some examples of the present disclosure. Mobile wallet domain computing device 17010 may perform the role of one or more of: MTA, PKS, and MSA. For example, one mobile wallet domain computing device 17010 may perform all of these roles, or multiple mobile wallet domain computing devices 17010 may perform these roles. Mobile wallet domain computing device 17010 may be an example of provider 1120, 1130 mobile wallet element issuer 1160, mobile wallet providers 2110, 2210, sender MTA 3020, recipient PKS 3040, recipient MTA 3060, recipient MSA 3070, recipient MTA 11020, sender PKS 11040, and the like. Mobile wallet domain computing device 17010 may perform the methods of one or more of FIGS. 6, 7, 8, 9, and portions or all of FIGS. 12, 14, and 15.

Mobile wallet domain computing device 17010 may be a desktop computer, laptop computer, tablet computer, mobile phone, smartphone, computer server, or wearable. Mobile wallet domain computing device may have a hardware layer 17006 including display interface 17130, network interface 17110, user input device interface(s) 17115, and data storage 17090. Mobile wallet domain computing device 17010 may have an operating system layer 17004 with one or more operating system(s) such as operating system 17050. Operating system 17050 may have, among other modules, an input module 17070, a network module 17072, a display module 17085, and a storage controller module 17087. Mobile wallet domain computing device may have an application layer 17002. Application layer 17002 may have many applications, but as shown, application layer includes mobile wallet domain applications 17020.

Included in mobile wallet domain application(s) 17020 is MTA module 17032 which may determine one or more public keys of one or more recipient mobile wallet applications, determine IP addresses of one or more recipient mobile wallet domain PKS' and MTAs, forward one or more mobile wallet messages to one or more other MTAs, and receive one or more mobile wallet messages from other MTAs where a mobile wallet application within the mobile wallet domain as the MTA is the recipient. MTA module 17032 may be an example implementation of MTA module 2100, 2200, 3020, 3060, 11020 and may implement FIGS. 6, 7, 8, and portions of FIGS. 12, 14, and 15.

Mobile wallet domain application(s) 17020 may also include PKS module 17034 which may manage and provide one or more public keys of mobile wallet users within the mobile wallet domain. PKS module 17034 may store, manage, and distribute public keys of mobile wallet applications within its mobile wallet domain. PKS module may be one example embodiment of PKS 2115, 2170, 3040, 11040, and may implement operations to receive a request from a MTA, the request including an address, determine from the address whether there is a public key matching the address stored in the PKS, and if there is a matching public key, send the public key back to the requesting MTA. If there is not a matching public key, send an error back to the requesting MTA.

Mobile wallet domain application(s) 17020 may also include an MSA module 17036. The MSA module 17036 may be an example embodiment of MSA 2230, 3070 and may perform the operations of FIG. 9. GUI module 17030 provides one or more GUIs and other user interfaces to users to provide for administration of the mobile wallet domain applications. GUI module 17030 may work with the display module 17085 of the operating system to provide a GUI for output on a display connected to display interface 17130.

Operating system layer 17004 provides one or more services to the application layer 17002 and manages hardware in the hardware layer 17006. Example tasks performed by the operating system layer 17004 includes providing one or more device drivers which manages hardware and provides one or more interfaces for applications in the application layer 17002 to utilize the hardware in the hardware layer 17006. Other tasks performed by the operating system layer 17004 include memory management, task scheduling, resource management, optimizations, security, and other tasks.

Input module 17070 is a device driver that manages user input device interface(s) 17115 and provides input sensed by devices connected to the user input device interface(s) 17115 to interested modules in the operating system layer 17004 and interested applications in the application layer 16002. Display module 17085 is a device driver that manages display interface 17130 and provides modules in the operating system layer 17004 and applications in application layer 17002 access to displays connected to display interface 17130. Storage controller module 17087 is a device driver that manages data storage 17090 and provides modules in the operating system layer 17004 and applications in application layer 17002 access to store and retrieve data in data storage 17090.

Network module 17072 is a device driver for the network interface 17110. Network module 17072 may manage network interface 17110 and provide network access to modules in the operating system layer 17004 and application layer 17002. Network module 17072 may implement one or more network protocols, such as Transmission Control Protocol (TCP), Internet Protocol (IP), 802 series protocols promulgated by the Institute of Electrical and Electronics Engineers (IEEE) including 802.11 protocols and 802.3 protocols, cellular protocols such as those promulgated by the Third Generation Partnership Project (3GPP) including Long Term Evolution (LTE) protocols and Long Term Evolution-Advanced (LTE-A) protocols, and others.

Data storage 17090 may be any type of non-transitory storage, such as Random Access Memory (RAM), Solid State Drives (SSD), Hard Disk Drives (HDD), magnetic storage, and optical storage. Display interface 17130 may be graphics hardware that connects to a Cathode Ray Tube (CRT), a Liquid Crystal Display (LCD), a Light Emitting Diode (LED) display, an Organic LED display, or the like. Display interface 17130 may be coupled to one or more user input devices to form a touch screen display. User input device interface(s) 17115 may be any interface to a user input device. Examples include Universal Serial Bus (USB), Serial ATA (SATA), Peripheral Component Interconnect Express (PCI-E), and the like. Input devices that may connect to the user input device interface(s) 17115 may include touch sensors (e.g., in a touch screen display), a keyboard, a mouse, a trackpad, a touchpad, and the like. Network interface 17110 may provide mobile wallet domain computing device 17010 with access to one or more computer networks. Network interface 17110 may be an Ethernet card, a Wireless Local Area Network (WLAN) card, a Radio Frequency Transmitter, or the like.

The present disclosure provides various ways for a mobile wallet to securely purchase one or more products—including goods and services—with online merchants via a network or with merchants via point-of-sale (POS) devices using secure purchasing data that may be stored in a QR code for example.

Figure 18:
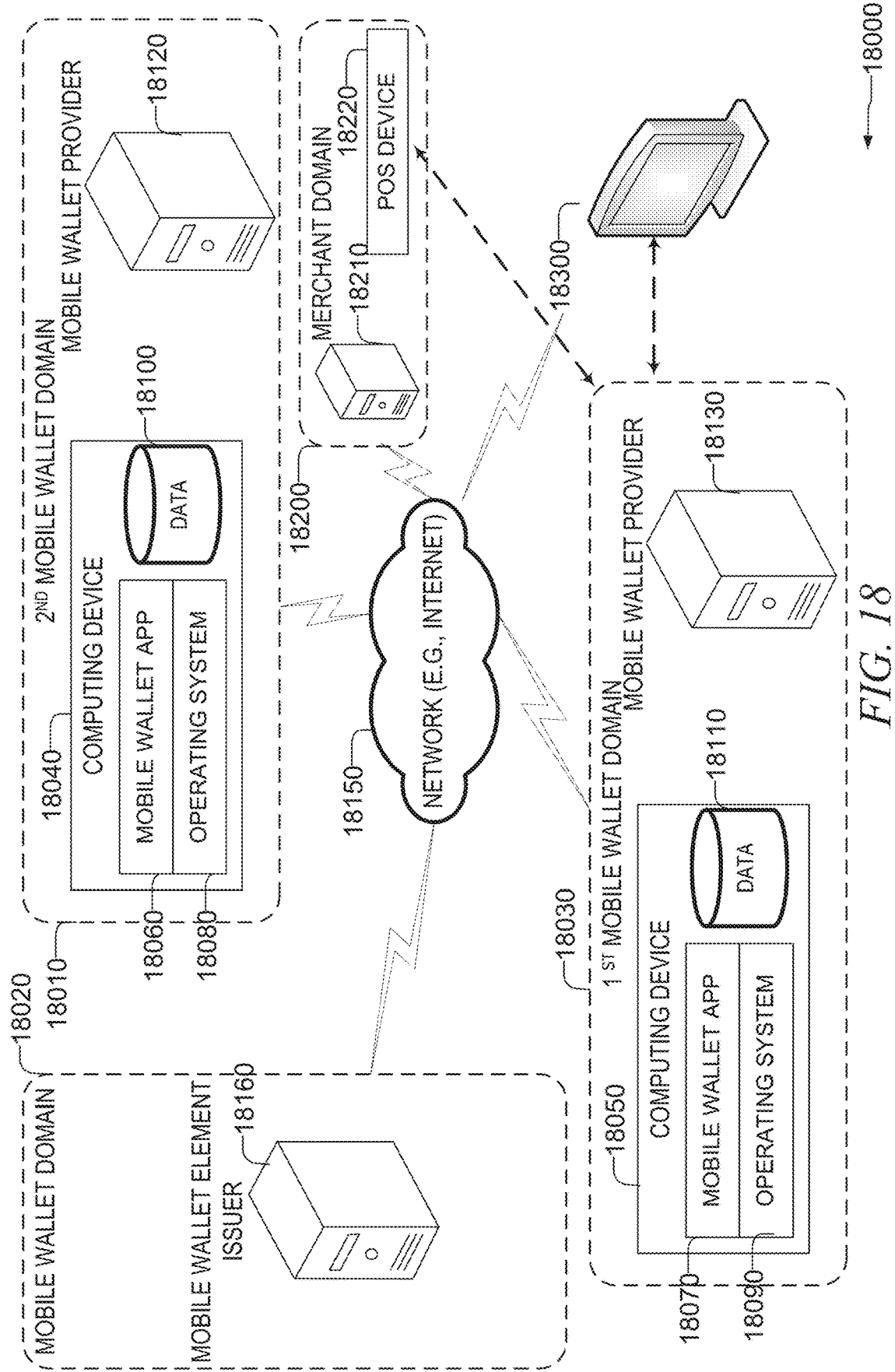
FIG. 18 is a diagram showing an example of an environment for mobile wallet transactions.

FIG. 18 is a diagram showing an example of an environment 18000 for mobile wallet transactions. The environment 18000 includes a first mobile wallet domain 18030 having computing device 18050 running a first mobile wallet 18070 and a second mobile wallet domain having a computing device 18040 running a second mobile wallet 18060. The environment 18000 also includes a merchant domain 18200 which may include a server system 18210 and a POS device 18220. The environment may further include a computing system 18300, mobile wallet providers 18120, 18130, a mobile wallet element issuer 18160 and network 18150 over which the various components may communicate. The environment 18000 is illustrative and may vary by application.

The mobile wallet 18070 may interact with the merchant domain 18200 in a number of manners. For example, using computing system 18300, a user may access an online store hosted by the merchant server system 18210 and select one or more products to purchase. In response, the merchant server system 18210 may generate a public key and a QR code storing purchasing data (e.g., product data, buyer data, merchant data, an/or a unique transaction identifier). In one example, the merchant server system 18210 may send the QR code to the computing system 18300 for display on a display device of the computing system 18300. The first mobile wallet 18070 may capture an image of the QR code, from the display device, using a camera (not shown) of the computing device 18050. The first computing device 18050 may decode the QR code to obtain the purchasing data and public key.

In another example, the merchant server system 18210 may send purchasing data or a QR code storing purchasing data to the mobile wallet 18070 over network 18150 using, for example, an address for the mobile wallet. A public key may be stored in the purchasing data or may be obtained using the domain name of the merchant either by accessing a cache or retrieving the public key from a DNS or CA. The mobile wallet 18070 may process a payment directly by sending payment credentials encrypted with the public key to the merchant domain 18200 or may pass the purchasing data or QR code to the second mobile wallet 18060 for approval or payment. The first and second mobile wallets 18070, 18060 may communicate with one another using any one or more of the communication techniques discussed herein including those discussed with regard to FIGS. 1-17.

In another example, the first mobile wallet 18070 may interact with the merchant's POS device 18220. For example, the POS device 18220 may send an invoice with a QR code storing purchasing data to the mobile wallet 18070 using NFC or may display a QR code with purchasing data for reading by the mobile wallet 18070 using a camera and QR reader application (not shown) operating on the computing device 18050. The purchasing data may be used by the mobile wallet 18070 to purchase the selected product(s) or may be sent from the mobile wallet 18070 to the second mobile wallet 18060 for approval or payment by the second mobile wallet, as mentioned above.

Figure 19:
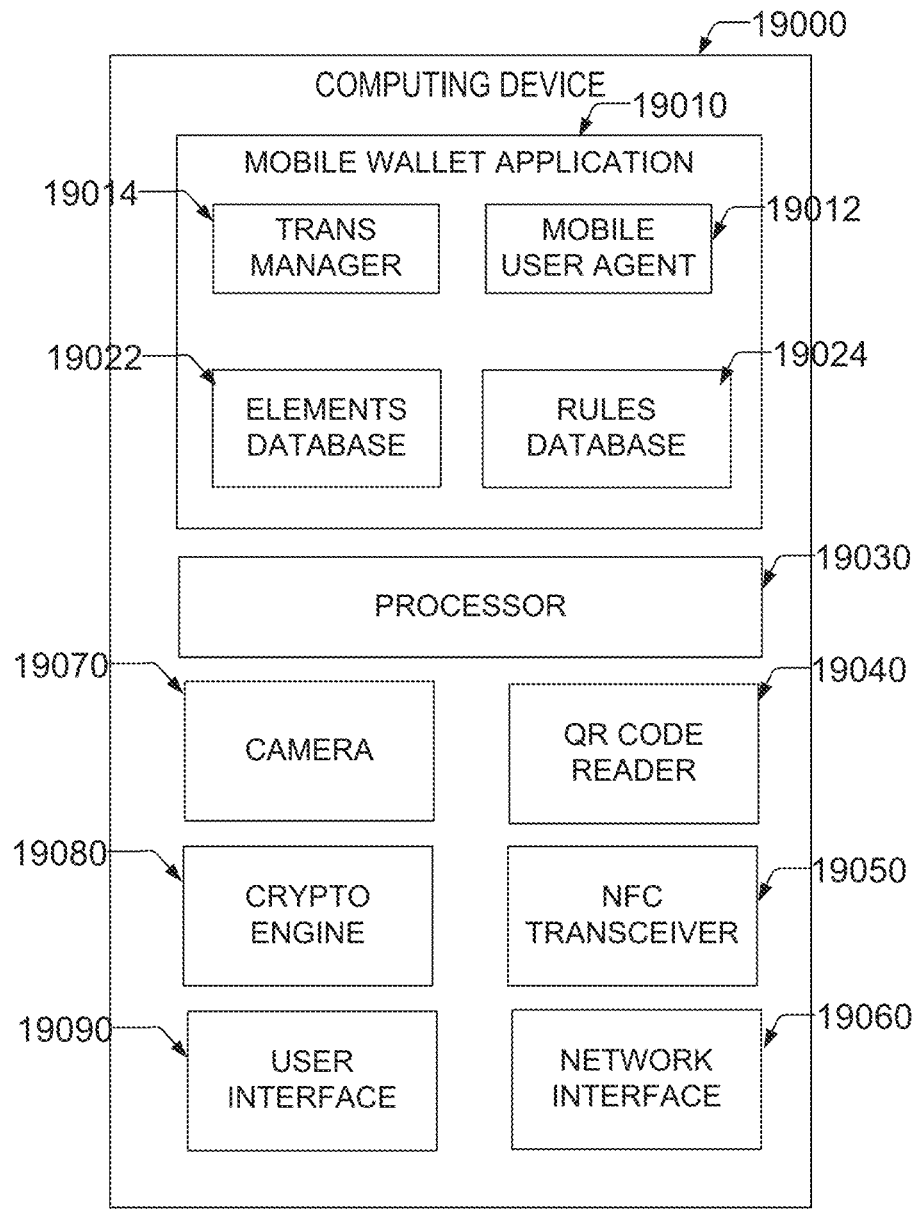
FIG. 19 is a block diagram illustrating a computing device with a mobile wallet application, according to an example embodiment.

FIG. 19 is a block diagram showing an example architecture of a mobile computing device 19000. The computing device 18050 of FIG. 18 may, for example, be implemented according to the architecture 19000. The architecture 19000 includes a mobile wallet application 19010 that includes a mobile user agent (MUA) 19012 and a transaction manager 19014. The MUA 19012 may allow a user to create, view, send and/or receive electronic messages. The MUA 19012 may for example operate as the MUA's discussed herein including those discussed with regard to FIGS. 1-17. The transaction manager 19014 may manage transactions with a merchant including for example determining when a payment may be made by the mobile wallet 19010 without processing by a second mobile wallet or when further processing by a mobile wallet such as approval or payment by the second mobile wallet is required.

The mobile wallet application 19010 may be stored on a memory (not shown) accessible by a processor 19030. The processor 19050 may include one or more processors any of a variety of different types of commercially available processors suitable for mobile computing devices (for example, an Advanced RISC Machine (ARM) architecture processors, XScale architecture microprocessor, a Microprocessor without Interlocked Pipeline Stages (MIPS) architecture processor, or another type of processor). The mobile device architecture 19000 may also include, among other things, a user interface 19090 such as a touch screen display and a network interface 19060 for communicating with a network such as network 1150 of FIG. 1.

The example architecture 19000 may further include an elements database 19022 for storing data regarding wallet elements and a rules database 19024 which contains rules for determining how to process purchases. The elements database 19022 and rules database 19024 may be stored on a memory (not shown) and accessible to the mobile wallet application 19010 and processor 19050.

The elements database 19022 may comprise data describing one or more elements of the mobile wallet 19010. Elements may include payment service elements and non-payment service elements. Payment service elements be and/or may reference user accounts that can fund a payment including, for example, credit card accounts, debit accounts, checking accounts, etc. Non-payment service elements may be and/or reference, user accounts, memberships, etc. that do not include funds for making a payment. Examples of non-payment service wallet elements include employee cards, insurance cards, membership cards, and driver's licenses. Data stored at the elements database 190190 may include, for example, transaction credentials for a wallet element (e.g., name and account identifiers), identification data uniquely identifying an element, historical usage data describing past uses of an element by the mobile wallet 19010, usage policy data describing when an element may be used, etc.

The rules database 19024 may include rules used by the mobile wallet to determine whether a payment needs approval or processing by another mobile wallet or whether the mobile wallet may submit payment without approval or processing by the second mobile wallet. The rules database 19024 may include rules that governing what payment elements may be used for a particular purchase. The rules may be provided to the mobile wallet by an issuer, a second mobile wallet or a wallet service provider during or after installation of a wallet element.

The rules database 19024 may store one or more rules for an individual payment element or for the mobile wallet as whole. Each rule may include one or more attributes such as approved products, approved merchants and/or approved spending limits for each element and/or the mobile wallet as whole. A rule may set any combination of approved products (e.g., all or certain products), approved merchants (e.g., all or certain merchants) or approved spending limits (e.g., no limit or a spending limit for certain transactions, products and/or merchants). For example, a rule may provide that a payment element (or the wallet as a whole) may be used for all transactions regardless of the type of product or merchant and dollar amount without requiring processing by a second mobile wallet. This rule may be beneficial where the element is owned by the mobile wallet owner. Another rule may provide that a payment element (or the wallet as a whole) may be used for all transactions regardless of the product or merchant subject to spending limits. Another rule may provide that the element (or the wallet as a whole) may be used for certain products and/or merchants with or without a spending limit. The latter rules may which may be useful where one person such as a parent wants to control the use of payment elements/wallet by another person such a child.

A rule may be stored as an entry in the database with conditional logic statements such as "If purchase is above X dollars, no approval needed." The columns of the database may include a condition column, a threshold column, and an action column. Other database architectures may be used without departing from the scope of this disclosure.

Although features 19022 and 19024 are referred to as databases, those features may be implemented using any suitable data structure including, for example, a relational database, a table, a list, etc. Moreover, while shown as separate databases, the features 19022 and 19024 may be stored in a common format (e.g., a single database, table, list, etc.).

The computing device 19000 may include an image-capturing device such as a camera 19070 and a QR code reader 19040. The QR code reader 19040 may be an application that works with the camera 19070 to read and decode a QR code presented on another device (e.g., another computing device or POS device) and obtain purchasing data for product(s) being purchased. The computing device 19000 may also include a NFC transceiver 19050 for receiving information from a POS device or other NFC enabled device over an NFC communication path. The computing device 19000 may, for example, receive an invoice containing a QR code holding purchasing data from a POS device. In an example, the purchasing data is sent directly instead of being encoded in the QR code. The computing device 19000 may include a cryptography engine 19080 for generating secure messages using public/private keys and decrypting messages, for example.

Figure 20:
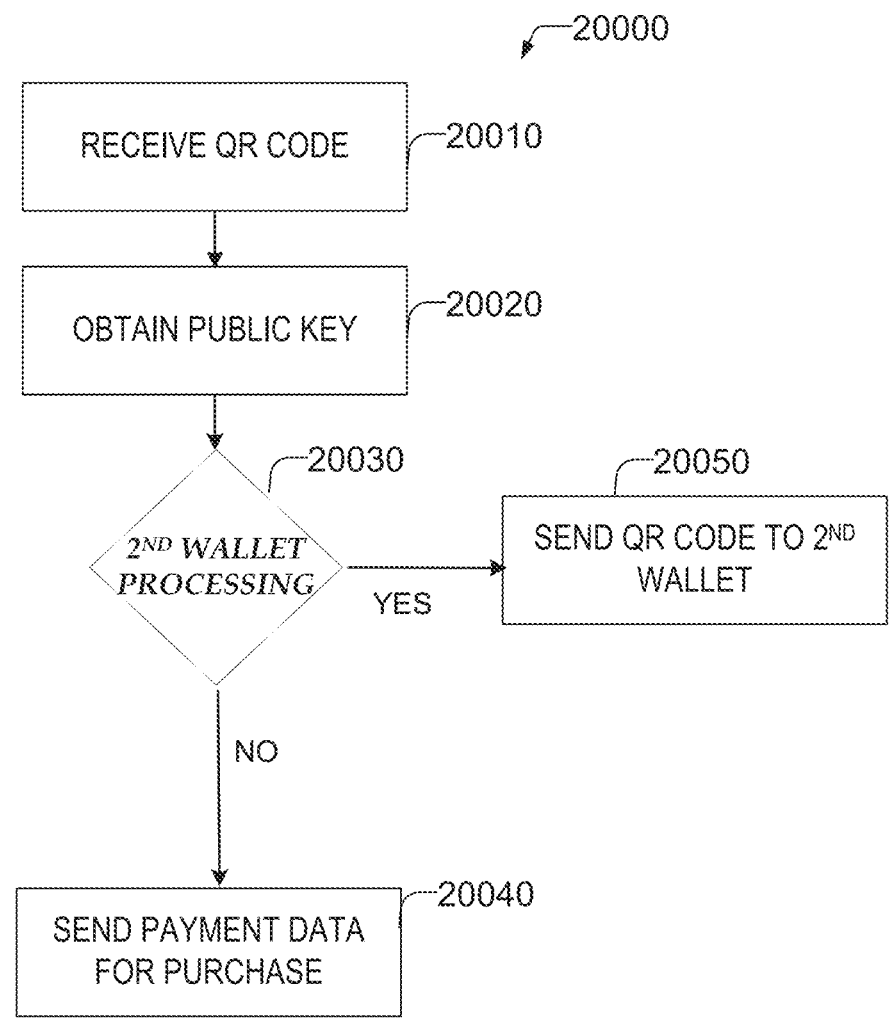
FIG. 20 is a flowchart showing a transaction process, according to an example embodiment.

FIG. 20 is a flowchart showing an example of a process flow 20000 that may be executed by a mobile wallet for processing an online transaction using a QR code and transaction rules. While illustrated with the QR code, secure purchasing data may be received and sent by mobile wallets through other means such as different codes, hyperlinks, and secure messaging. At 20010, the mobile wallet may receive a QR code from an online merchant. The QR code may be generated by the merchant in response to a user placing one or more products in a shopping cart. The QR code may store purchasing data such as product data, buyer data, merchant data, and a unique transaction identifier. The buyer data may include one or more of the buyer's name, mailing address, email address, phone number, and mobile wallet address. The product data may include one or more of the product name and cost. The merchant data may include one or more of the merchant's name, domain name and public key.

The merchant may store a private key associated with the merchant's public key in a memory associated with the merchant's computing system. The unique transaction identifier may allow the merchant to associate the products in the shopping cart with a payment made through a different channel. The merchant may store the purchasing data (e.g., store the data or the QR code or both) for use in later identifying the transaction using the unique transaction identifier and to communicate with the buyer.

In an embodiment, the mobile wallet may receive the QR code by taking a picture of the QR code while the code is displayed on another computing system. The other computing system may be one used by the user of the mobile wallet to place the product in a shopping cart. In another embodiment, the QR code (or the data encoded therein) may be received by the mobile wallet from the merchant via email or text message. The merchant may, for example, receive the network address of the mobile wallet from the mobile wallet or another computing device while checking out of the shopping cart or based on a profile of the user stored by the merchant.

At 20020, the mobile wallet obtains the public key of the merchant. The mobile wallet may obtain the key using the QR code. In some embodiments, the QR code may store the public key and the mobile wallet may obtain the key by reading the QR code. In other embodiments, the QR code may store the domain name of the merchant, and the mobile wallet may obtain the public key of the merchant from other sources such as from a local cache (if not expired) or from a DNS or CA using the domain name address of the merchant.

At 20030, the mobile wallet determines whether the purchase of the product requires further processing by a second mobile wallet. This may include comparing at least some of the secure purchasing data to transaction rules for the mobile wallet or payment elements of the wallet. For example, the rules may include attributes defining one or more of approved products, approved merchants and approved spending limits for an element or the mobile wallet. The mobile wallet may compare at least some of the purchasing data (e.g., buyer name, product name and/or product cost) with the rules to determine whether the purchase may be completed by the first mobile wallet without processing (e.g., approval or payment) by the second mobile wallet. In some examples, the mobile wallet may receive a selection on a payment element from a user and then check the rules for the payment element to determine whether the purchase may be made by the first mobile wallet or whether processing by another mobile wallet is necessary. In some examples, the mobile wallet may determine available payment elements based on the rules and limit the display of available payment elements.

If the determination indicates that the purchase may be completed by the first mobile wallet without further processing, the first mobile wallet may send payment data to the merchant for purchasing the product as indicated at block 20040. This may include sending payment data encrypted with the public key of the merchant so that the merchant can decrypt the payment data with a private key and process payment. The payment data may include product data and payment credentials for a payment element.

If the determination indicates that the purchase requires processing by the second mobile wallet, the first mobile wallet may send the QR code (or the purchase data encoded therein) to the second mobile wallet as indicated at block 20050. The second mobile wallet may use at least some of the purchasing data to approve the purchase or submit payment for the purchase of the product. For example, the second mobile wallet may present the product data (e.g., name and cost), buyer data (e.g., name) and merchant data (e.g., name) on a display for a user input to approve the transaction or submit payment for the purchase. In the case where the second mobile wallet user approves a transaction, an approval message may be sent to the first mobile wallet, and after receiving the approval, the first mobile wallet may submit payment data to the merchant for purchasing the product. In the case where the second mobile wallet submits payment for the transaction, the second mobile wallet may submit payment data to the merchant and send a message to the first mobile wallet indicating that the second mobile wallet purchased the product. The second mobile wallet may use the QR code transferred from the first mobile wallet to obtain the public key of the merchant and submit the payment data in an encrypted manner.

Figure 21:
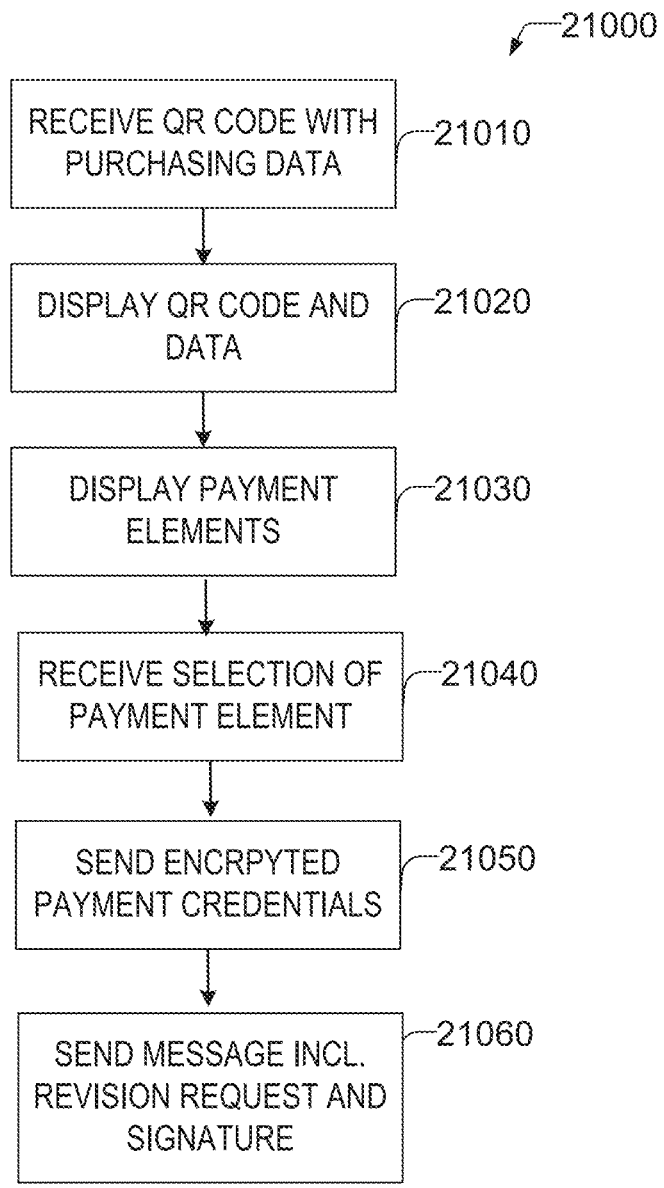
FIG. 21 is a flowchart showing a transaction process, according to an example embodiment.

FIG. 21 is a flowchart showing an example of a process flow 21000 that may be executed by mobile wallet for purchasing a product from an online merchant using a QR code. At 21010, the mobile wallet may receive a QR code containing secure purchasing data from a server system associated with a merchant. The mobile wallet may receive the data by reading the QR code from its display, a display of another device, or by receiving the QR code by email or text message for example. The purchasing data may include one or more of buyer data, product data, merchant data as discussed above. The merchant data may include a public key or a domain name that may be used by the mobile wallet to obtain the public key.

At block 21020, the mobile wallet may display the QR code and at least some of the purchasing data read from the QR code on the mobile wallet's user interface. For example, the mobile wallet may display the product name, the merchant name and the product cost for the user. At block 21030, the mobile wallet may display one or more payment elements available to the mobile wallet for purchasing the product. The QR code, purchasing data and payment elements may be displayed at the same time. In some embodiments, the mobile wallet may determine an available set of payment elements based transaction rules and allow selection of only one of the available payment elements. This may include presenting one or more payment elements in drop down menu or scrolling interface allowing user selection. At block 21040, the mobile wallet may receive a selection from a user of a particular payment element from among those displayed. In some embodiments, the mobile wallet may receive a user selection via the user interface to transfer the QR code to a second mobile wallet for approval or payment for the product by the second mobile wallet.

At block 21050, the mobile wallet may send encrypted payment data to the server system of the merchant. The payment data may be encrypted with the public key of the merchant so that the merchant may decrypt the payment data with its private key and subsequently process payment for the product. The payment data may include at least some of the purchasing data (e.g., product name, product cost) and payment credentials for the selected payment element.

Figure 22:
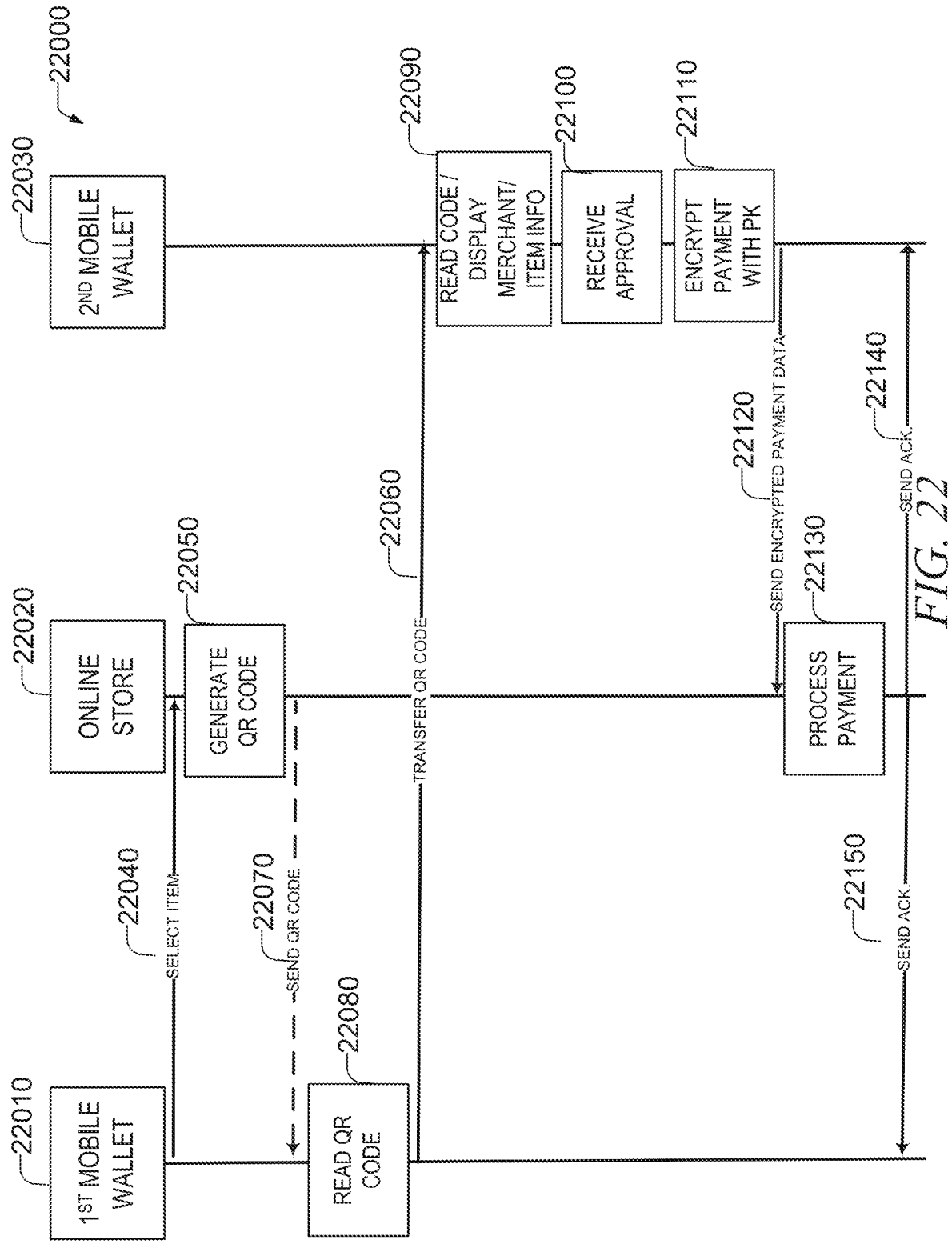
FIG. 22 is a timing diagram showing an example of a mobile wallet transaction process using a QR code.

FIG. 22 is a timing diagram showing one example of a mobile wallet transaction process 22000 utilizing QR codes to allow a second mobile wallet to make a purchase on behalf of a first mobile wallet. The process 22000 may operate using a mobile wallet 22010, an online store 22020, and a second mobile wallet 22030. The online store may be a computer system associated with an merchant domain. In the timing diagram of FIG. 5, time passes from top to bottom. For example, messages and actions closer to the top of the timing diagram of FIG. 5 may occur before actions that are closer to the bottom. At 22040, the first mobile wallet may select an product (or products) to purchase. This may be performed by accessing the online store and placing the product in a shopping cart, for example. In other embodiments, a separate computer (not shown) may be used to select the product. The online store may generate a QR code storing data for purchasing the product as indicated at block 22050. This may include buyer data, merchant data, and product data, as discussed above.

At 22070, the online store may send the QR code directly to the first mobile wallet or may send the QR code to the other computing system to display the QR code so that it may be received by the first mobile wallet via a camera, for example. The first mobile wallet may read the QR code as indicated at 22080 and may display the QR code and/or the some of the purchasing data encoded in the code. At 22060, the first mobile wallet may send the QR code to a second mobile wallet 22030. This may be done in response to transaction rules or user selection.

At 22090, the second mobile wallet decodes the QR code and displays at least some of the purchasing data stored on the QR code such as the buyer name, the product name and the product cost. At 22100, the second mobile wallet may receive approval for the purchase of the product from a user. This may include the user selecting a payment element from the second mobile wallet for making the purchase. In other embodiments, the second mobile wallet may automatically approval a purchase request by a particular payment element based on transaction rules stored on the second mobile wallet. After receiving approval from the user or automatically, the second mobile wallet may encrypt a payment package including payment credentials for the selected payment element using the public key of the merchant as indicated at block 22110. The public key may be obtained by the second mobile wallet by reading the QR code or by obtaining the public key from cache or a DNS or CA based on a domain name of the merchant read from the QR code.

At 22120, the second mobile wallet sends encrypted payment data to the online store 22020. The payment data may include the payment credentials, an amount such as the product cost and a transaction identifier. The online store 22020 may decrypt the payment data with its private key and process payment for the product through a payment processing network at 22130. The online store 22020 may lookup transaction details using the transaction identifier to obtain product data and the buyer data including buyer's mailing address, email address and mobile wallet address, for example. The online store may send acknowledgements of a successful payment to the first and second mobile wallets 22010, 22030 as indicated at 22140 and 22150.

The present disclosure also provides various ways for a mobile wallet to transact with online merchants using a POS emulator. This may allow for a mobile wallet to transact with an online merchant without the need for a physical POS device while allowing the online merchant to use some or all of its traditional backend infrastructure for processing POS packages.

Figure 23:
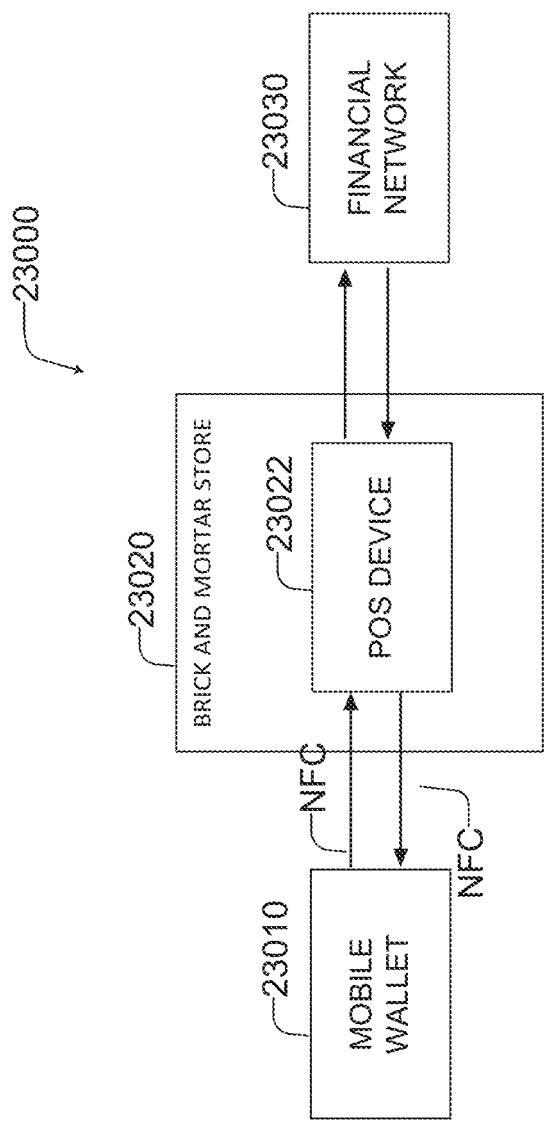
FIG. 23 is a block diagram showing an example of a prior art point-of-sale transaction process.

FIG. 23 is a prior art diagram illustrating the use of a mobile wallet 23010 making a purchase at a brick and mortar store 23020 using a POS device 23022. The mobile wallet 23010 may submit a payment to the POS device 23022 using near field communication (NFC). The NFC communication may include the mobile wallet sending payment credentials such as a token and cryptogram to the POS device 23022. The POS device 23022 may request an authorization of the payment to a financial network 23030 over a network such as the internet. The financial network 23030 may obtain authorization for the payment from the issuer of the payment element and inform the POS device of a successful authorization. The POS device may then accept the payment and inform the mobile wallet of completion of the transaction using the NFC channel.

Many user's purchase products from online stores using a web browser connection over the internet rather than an NFC connection as at a brick and mortar store. Many online stores operate brick and mortar locations as well. It would be beneficial to provide a process by which users purchasing from online stores may use a mobile wallet for purchases and send payment information over an internet connection as if it were communicated by NFC.

Figure 24:
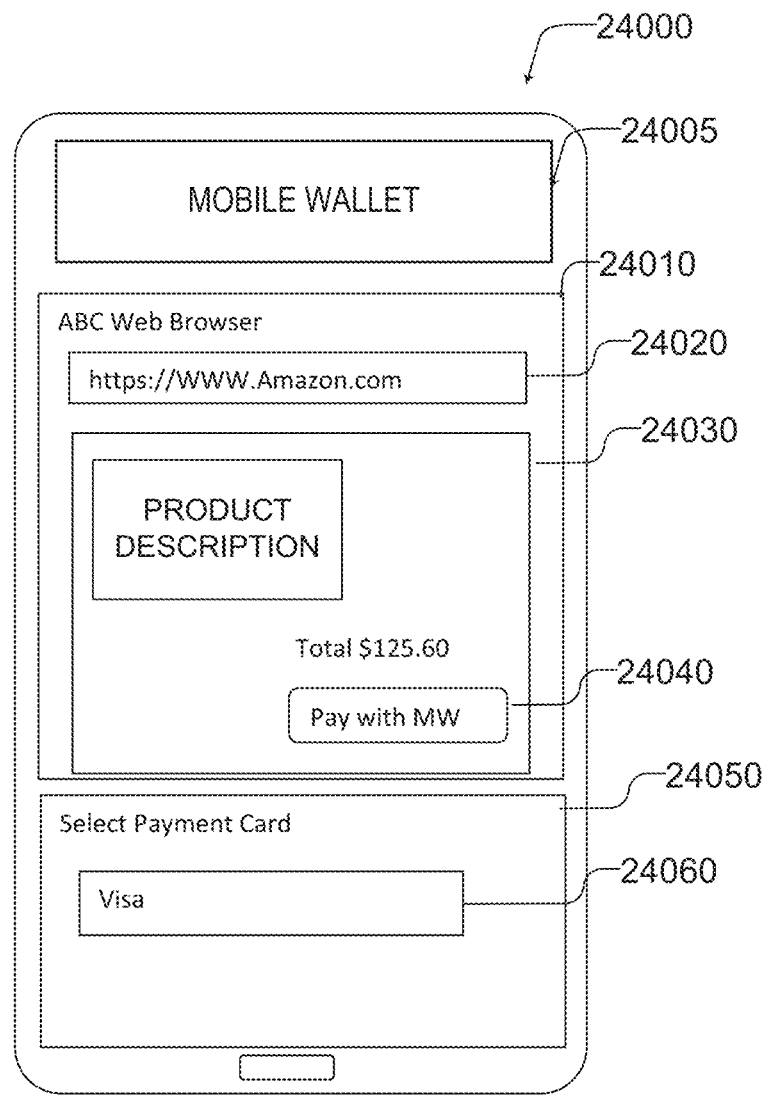
FIG. 24 is a block diagram illustrating a computing device with a mobile wallet application, according to an example embodiment.

FIG. 24 illustrates an embodiment of a mobile device 24000 having a mobile wallet 24005 that may perform online transactions using POS packages and a web-connected browser rather than using NFC. The mobile wallet 24005 may present, in a user interface, a web browser 24010 and a payment selector 24050 in a display. The browser 24010 may be integral part of the mobile wallet 24005 or a separate application operating on a processor of the mobile device in communication with the mobile wallet 24005 via an application program interface (API). The browser 24010 may allow a user to establish a secure connection by a secure communication protocol such as HTTPS with an online store and select products to purchase. The browser 24010 may comprise a box 24020 to enter the URL of the online store and may display a description and price of a product and a button 24040 indicating to pay for the product with the mobile wallet. The payment selector 24050 may include a box 24060 to select a payment element (e.g., credit card, debit card) for purchasing the product.

After the user selects a product to purchase and selects a payment card using box 24060, the user may click or touch the pay with mobile wallet button 24040. The mobile wallet 24005 may produce a POS payment package and send the POS payment package to the online store. The POS payment package may be encrypted and may contain the same information as is sent to a POS device when the mobile wallet 24005 submits a payment card to a physical POS device over NFC. For example, the POS payment package may include a token and cryptogram (e.g., generated by a secure element on the computing system of the mobile wallet). In other embodiments, the POS payment package from the mobile wallet 24005 sent to the online store may contain more information than what a physical POS device receives over NFC. Before producing or sending a POS payment package, the mobile wallet 24005 may receive authentication from a user such a fingerprint scan or personal identification number. The online store may receive the POS payment package as if it were obtained via NFC from a physical POS device and may send POS package data to a payment network to obtain payment authorization. The POS payment package may be delivered to the online store by uploading it through the browser or sending it as an email attachment or other method.

Figure 25:
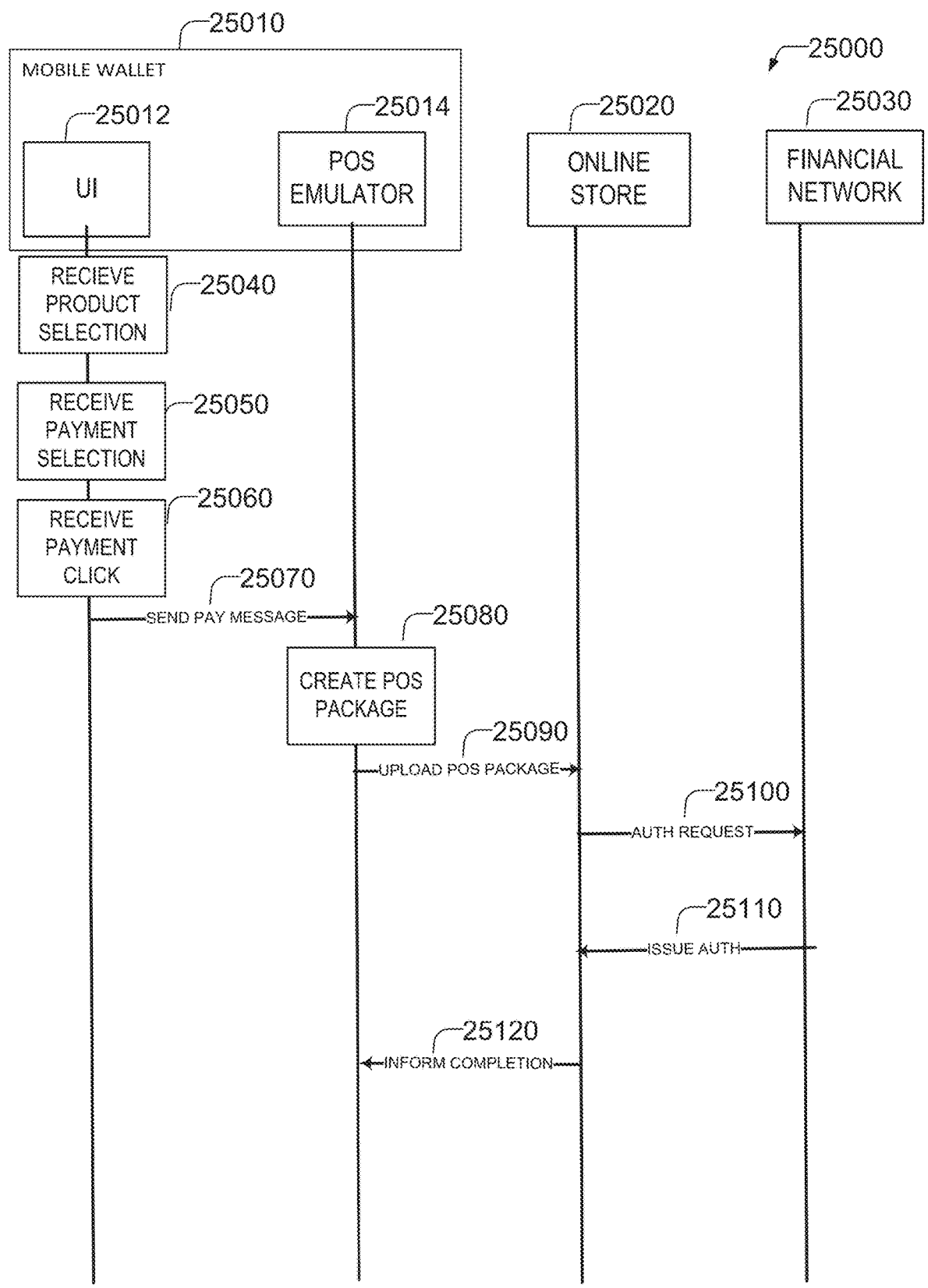
FIG. 25 is a timing diagram showing an example of a mobile wallet transaction process using POS emulator.

FIG. 25 is a timing diagram showing one example of transaction process 25000 between a mobile wallet and an online store using a POS emulator. The process 25000 may operate using a mobile wallet 25010 associated with a user interface (UI) 25012 and POS emulator 25014, an online store 25020, and an financial network 25030. The online store may be a computer system associated with a merchant domain. In the timing diagram of FIG. 25, time passes from top to bottom. For example, messages and actions closer to the top of the timing diagram of FIG. 25 may occur before actions that are closer to the bottom. At 25040, the mobile wallet through user interface 25012 may receive a product selection from a user. The user interface may for example display a web browser and payment element selector as illustrated in FIG. 24. A user may select a product to purchase from the online store 25020 using the browser for example. At 25060, the mobile wallet 25010 through UI 25012 may receive a payment element (e.g., a credit card) selection from a user and receive at 25060 a payment button click or press indicating to purchase the product using the selected payment element of the mobile wallet 25010. The action of touching the button may send a pay message 25070 to the POS emulator which can produce a POS package as indicated at 25080. In some embodiments, the POS emulator 25014 me be a background application that may be invoked when it is needed (e.g., when it receives a pay message 25070).

The POS package created at 25080 may contain the same data submitted to a POS device when a mobile wallet makes a payment to a POS device over NFC. The mobile wallet 25010 (e.g., the POS emulator 25014) may upload the POS package to the online store 25020 via a secure communication connection as indicated at 25090. The online store 25020 may send an authorization request to the financial network for payment as indicated at 25100. The authorization request may include sending the POS package or data contained in the POS package to the financial network 25030 for processing. The online store may communicate with the financial network in the same manner as if the POS package was obtained via a POS device with NFC. The element issuer may issue an authorization of the payment at 25110 and the online store may inform the mobile wallet of completion at 25120.

Figure 26:
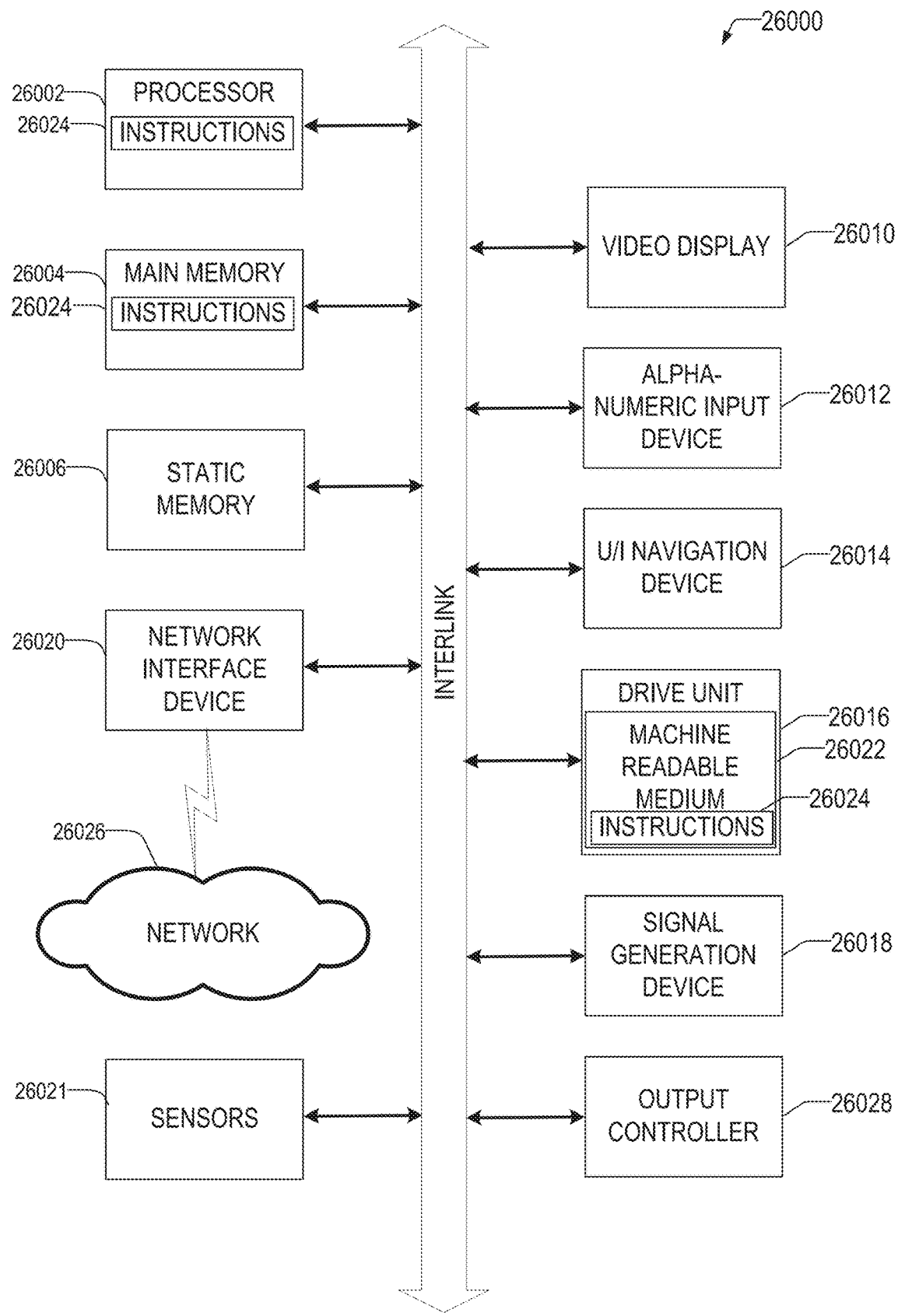
FIG. 26 is a block diagram illustrating an example of a machine upon which one or more embodiments may be implemented.

FIG. 26 illustrates a block diagram of an example machine 26000 upon which any one or more of the techniques (e.g., methodologies) discussed herein may perform. In alternative embodiments, the machine 26000 may operate as a standalone device or may be connected (e.g., networked) to other machines. In a networked deployment, the machine 26000 may operate in the capacity of a server machine, a client machine, or both in server-client network environments. In an example, the machine 26000 may act as a peer machine in peer-to-peer (P2P) (or other distributed) network environment. The machine 26000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 26000 may function as an MUA, MTA, computing device executing a mobile wallet application, DNS, CA, PKS, Key Manager, Key Keeper, or the like. For example, the Machine 26000 may be configured to perform any of the operations of FIGS. 5-10, 12, 14-15 and 20-21. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 26000 may include a hardware processor 26002 (e.g., a central processing unit (CPU), a graphics processing unit (GPU), a hardware processor core, or any combination thereof), a main memory 26004 and a static memory 26006, some or all of which may communicate with each other via an interlink (e.g., bus) 26008. The machine 26000 may further include a display unit 26010, an alphanumeric input device 26012 (e.g., a keyboard), and a user interface (UI) navigation device 26014 (e.g., a mouse). In an example, the display unit 26010, input device 26012 and UI navigation device 26014 may be a touch screen display. The machine 26000 may additionally include a storage device (e.g., drive unit) 26016, a signal generation device 26018 (e.g., a speaker), a network interface device 26020, and one or more sensors 26021, such as a global positioning system (GPS) sensor, compass, accelerometer, or other sensor. The machine 26000 may include an output controller 26028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 26016 may include a machine readable medium 26022 on which is stored one or more sets of data structures or instructions 26024 (e.g., software) embodying or utilized by any one or more of the techniques or functions described herein. The instructions 26024 may also reside, completely or at least partially, within the main memory 26004, within static memory 26006, or within the hardware processor 26002 during execution thereof by the machine 26000. In an example, one or any combination of the hardware processor 26002, the main memory 26004, the static memory 26006, or the storage device 26016 may constitute machine readable media.

While the machine readable medium 26022 is illustrated as a single medium, the term "machine readable medium" may include a single medium or multiple media (e.g., a centralized or distributed database, and/or associated caches and servers) configured to store the one or more instructions 26024.

The term "machine readable medium" may include any medium that is capable of storing, encoding, or carrying instructions for execution by the machine 26000 and that cause the machine 26000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 26024 may further be transmitted or received over a communications network 26026 using a transmission medium via the network interface device 26020. The Machine 26000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 26020 may include one or more physical jacks (e.g., Ethernet, coaxial, or phone jacks) or one or more antennas to connect to the communications network 26026. In an example, the network interface device 26020 may include a plurality of antennas to wirelessly communicate using at least one of single-input multiple-output (SIMO), multiple-input multiple-output (MIMO), or multiple-input single-output (MISO) techniques. In some examples, the network interface device 26020 may wirelessly communicate using Multiple User MIMO techniques.

What is claimed is:

1. A method comprising:
   receiving, with a first mobile wallet and from a server system associated with a merchant, secure purchasing data for a product, the secure purchasing data including product data and merchant data, wherein the first mobile wallet includes a first application program executing on a first computing device;
   obtaining a public key for the merchant using the secure purchasing data;
   determining, using the first mobile wallet, that a purchase of the product requires processing by a second mobile wallet based on transaction rules and at least some of the secure purchasing data, wherein the second mobile wallet includes a second application program executing on a second computing device; and
   based on the determination, performing with the first mobile wallet:
   sending a request for processing to the second mobile wallet using a first mobile wallet message transfer agent (MTA), including retrieving a key of the second mobile wallet from a public key server (PKS) provided by the second mobile wallet,
   encrypting the request using the key to create a message, and
   sending the message from the first MTA to a second MTA of the second mobile wallet, the request including at least some of the secure purchasing data.

2. The method of claim 1, wherein receiving the secure purchasing data includes capturing a QR code that includes the secure purchasing data.

3. The method of claim 2, wherein obtaining the public key includes decoding the QR code.

4. The method of claim 2, wherein the QR code is encoded with the product data, the merchant data, and buyer data, the product data including a name and a cost of the product, the merchant data including at least of the public key and a domain name for the merchant.

5. The method of claim 2, wherein sending the request for processing to the second mobile wallet includes sending the second mobile wallet the QR code.

6. The method of claim 1, further including, after sending a request for processing to the second mobile wallet, receiving approval for the purchase from the second mobile wallet and sending, with the first mobile wallet, payment data to the server system of the merchant after receiving the approval.

7. The method of claim 1, further including, after sending a request for processing to the second mobile wallet, receiving a message from the second mobile wallet indicating that the second mobile wallet purchased the product.

8. The method of claim 1, wherein determining whether the purchase of the product requires processing by the second mobile wallet includes comparing at least some of the secure purchasing data to rules, wherein the rules including attributes including at least one of one or more approved products, one or more approved merchants, and one or more approved spending limits.

9. A non-transitory computer-readable storage medium, the computer-readable storage medium including instructions that when executed by a computer, cause the computer to perform operations of:
   receiving, with a first mobile wallet and from a server system associated with a merchant, secure purchasing data for a product, the secure purchasing data including product data and merchant data, wherein the first mobile wallet includes a first application program executing on a first computing device;
   obtaining a public key for the merchant using the secure purchasing data;
   determining, using the first mobile wallet, that a purchase of the product requires processing by a second mobile wallet based on transaction rules and at least some of the secure purchasing data, wherein the second mobile wallet includes a second application program executing on a second computing device; and
   based on the determination, performing with the first mobile wallet:

sending a request for processing to the second mobile wallet using a first mobile wallet message transfer agent (MTA), including retrieving a key of the second mobile wallet from a public key server (PKS) provided by the second mobile wallet, encrypting the request using the key to create a message, and sending the message from the first MTA to a second MTA of the second mobile wallet, the request including at least some of the secure purchasing data.

10. The non-transitory computer-readable storage medium of claim 9, further including instructions that when executed by a computer, cause the computer to perform operations of:

after sending a request for processing to the second mobile wallet, receiving approval for the purchase from the second mobile wallet and sending, with the first mobile wallet, payment data to the server system of the merchant after receiving the approval.

11. The non-transitory computer-readable storage medium of claim 9, further including instructions that when executed by a computer, cause the computer to perform operations of:

after sending a request for processing to the second mobile wallet, receiving a message from the second mobile wallet indicating that the second mobile wallet purchased the product.

12. The non-transitory computer-readable storage medium of claim 9, wherein determining whether the purchase of the product requires processing by the second mobile wallet includes comparing at least some of the secure purchasing data to rules, wherein the rules including attributes including at least one of one or more approved products, one or more approved merchants, and one or more approved spending limits.

13. The non-transitory computer-readable storage medium of claim 9, wherein receiving the secure purchasing data includes capturing a QR code that includes the secure purchasing data.

14. The non-transitory computer-readable storage medium of claim 13, wherein sending the request for processing to the second mobile wallet includes sending the second mobile wallet the QR code.

15. A system comprising:

at least one processor; and at least one storage device comprising instructions, which when executed by the at least one processor, configure to at least one processor to perform operations comprising:

receiving, with a first mobile wallet and from a server system associated with a merchant, secure purchasing data for a product, the secure purchasing data including product data and merchant data, wherein the first mobile wallet includes a first application program executing on a first computing device;

obtaining a public key for the merchant using the secure purchasing data;

determining, using the first mobile wallet, that a purchase of the product requires processing by a second mobile wallet based on transaction rules and at least some of the secure purchasing data, wherein the second mobile wallet includes a second application program executing on a second computing device; and based on the determination, performing with the first mobile wallet:

sending a request for processing to the second mobile wallet using a first mobile wallet message transfer agent (MTA), including retrieving a key of the second mobile wallet from a public key server (PKS) provided by the second mobile wallet, encrypting the request using the key to create a message, and sending the message from the first MTA to a second MTA of the second mobile wallet, the request including at least some of the secure purchasing data.

16. The system of claim 15, wherein determining whether the purchase of the product requires processing by the second mobile wallet includes comparing at least some of the secure purchasing data to rules, wherein the rules including attributes including at least one of one or more approved products, one or more approved merchants, and one or more approved spending limits.

17. The system of claim 16, wherein receiving the secure purchasing data includes capturing a QR code that includes the secure purchasing data.

18. The system of claim 17, wherein obtaining the public key includes decoding the QR code.

19. The system of claim 17, wherein the QR code is encoded with the product data, the merchant data, and buyer data, the product data including a name and a cost of the product, the merchant data including at least of the public key and a domain name for the merchant.

20. The system of claim 17, wherein sending the request for processing to the second mobile wallet includes sending the second mobile wallet the QR code.

* * * * *